United States Patent
Takeo

(10) Patent No.: US 11,486,111 B2
(45) Date of Patent: Nov. 1, 2022

(54) SHOVEL WITH OUTPUT RESTRICTION BASED ON TEMPERATURE OF COMPONENTS

(71) Applicant: SUMITOMO (S.H.I.) CONSTRUCTION MACHINERY CO., LTD., Tokyo (JP)

(72) Inventor: Jitsutaka Takeo, Chiba (JP)

(73) Assignee: SUMITOMO (S.H.I.) CONSTRUCTION MACHINERY CO., LTD., Tokyo (JP)

( * ) Notice: Subject to any disclaimer, the term of this patent is extended or adjusted under 35 U.S.C. 154(b) by 82 days.

(21) Appl. No.: 15/228,883

(22) Filed: Aug. 4, 2016

(65) Prior Publication Data

US 2016/0340861 A1 Nov. 24, 2016

Related U.S. Application Data

(63) Continuation of application No. PCT/JP2015/056553, filed on Mar. 5, 2015.

(30) Foreign Application Priority Data

Mar. 6, 2014 (JP) .............................. JP2014-044239
Mar. 12, 2014 (JP) .............................. JP2014-049501

(51) Int. Cl.
*E02F 3/32* (2006.01)
*E02F 9/20* (2006.01)
(Continued)

(52) U.S. Cl.
CPC .............. *E02F 3/32* (2013.01); *E02F 9/0866* (2013.01); *E02F 9/123* (2013.01); *E02F 9/2075* (2013.01);
(Continued)

(58) Field of Classification Search
None
See application file for complete search history.

(56) References Cited

U.S. PATENT DOCUMENTS 8,639,404 B2  1/2014  Sugiyama et al.
9,108,516 B2  8/2015  Sugiyama et al.
(Continued)

FOREIGN PATENT DOCUMENTS

EP       2357150 A1   8/2011
JP   2010-222815 A   10/2001
(Continued)

OTHER PUBLICATIONS

PCT International Search Report and Written Opinion, PCT Application No. PCT/JP2015/056553, dated Jun. 2, 2015, 10 pages (with English translation of search report).

(Continued)

*Primary Examiner* — Frederick M Brushaber
*Assistant Examiner* — Matthew J. Reda
(74) *Attorney, Agent, or Firm* — Fenwick & West LLP

(57) ABSTRACT

A shovel according to embodiments of the present invention includes: a lower traveling body; an upper swivel body that is rotatably mounted on the lower traveling body; an attachment that is configured by a boom, an arm, and an end attachment; an engine that is mounted on the upper swivel body; a motor generator that is able to assist the engine; a power storage system that is mounted on the upper swivel body; a swiveling motor that is driven by electric power from the motor generator and the power storage system; temperature detection units; and a control device. The control device switches a control mode in a case where at least one of a temperature relating to the motor generator, a temperature relating to the power storage system, and a temperature relating to the swiveling motor, detected by the (Continued)

Figure 1:
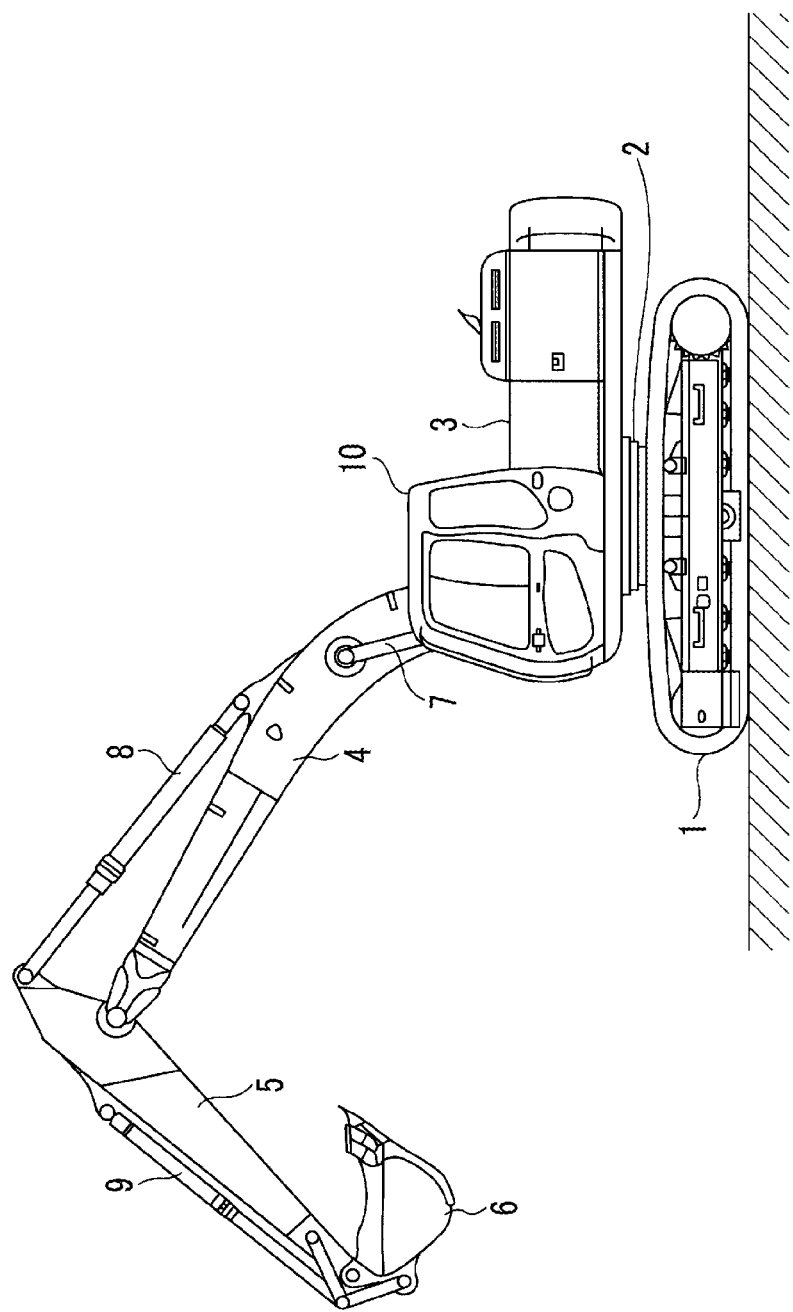
Figure 2:
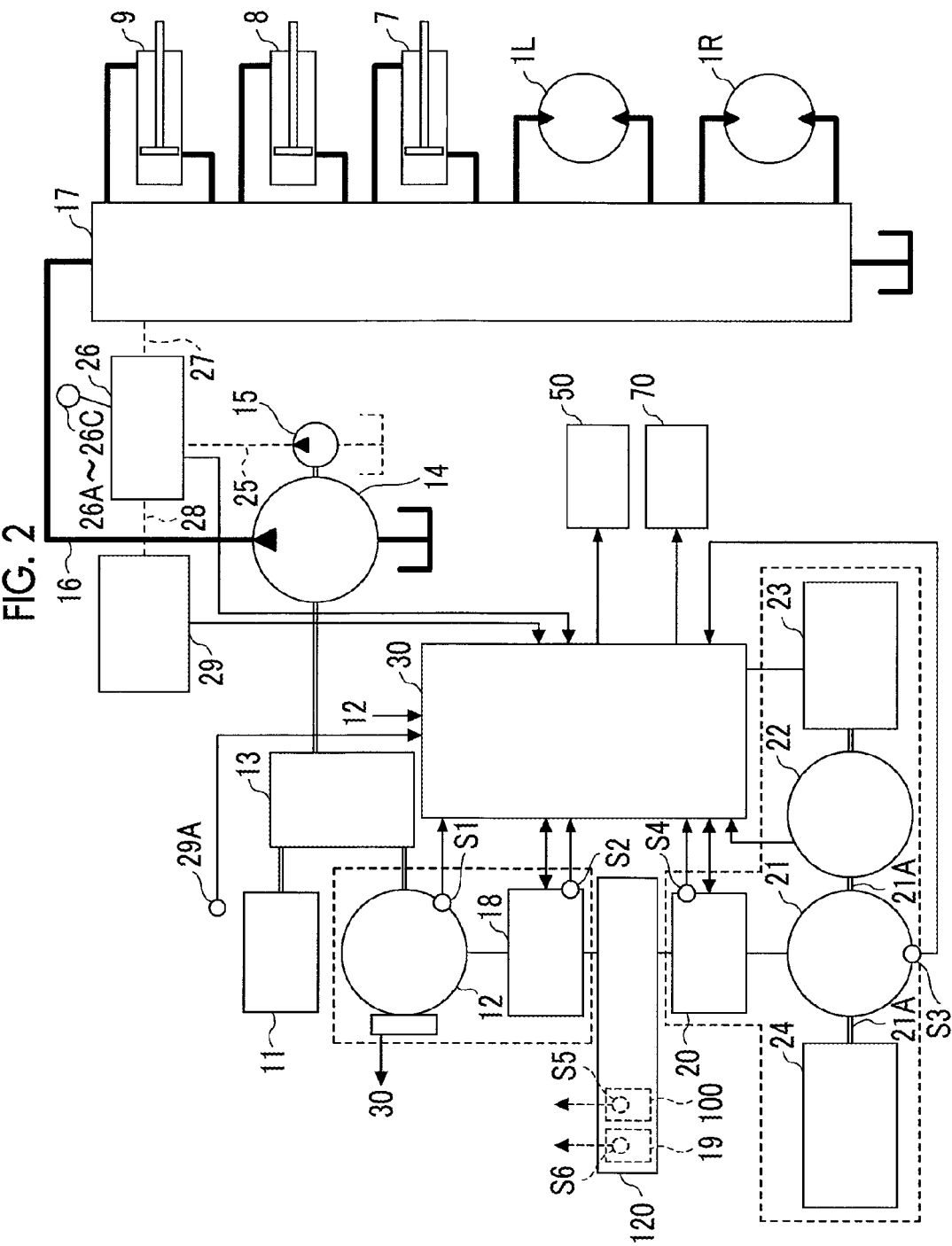

temperature detection units, is higher than a predetermined temperature.

19 Claims, 17 Drawing Sheets

(51) Int. Cl.
    *E02F 9/12*     (2006.01)
    *E02F 9/08*     (2006.01)
    *G05B 9/02*     (2006.01)
    *G05B 13/02*     (2006.01)
    *E02F 9/22*     (2006.01)

(52) U.S. Cl.
    CPC .......... *E02F 9/2095* (2013.01); *E02F 9/226* (2013.01); *G05B 9/02* (2013.01); *G05B 13/02* (2013.01); *E02F 9/2296* (2013.01); *Y10S 903/902* (2013.01)

(56) References Cited

U.S. PATENT DOCUMENTS

| | | | | |
|---|---|---|---|---|
| 2009/0014433 A1* | 1/2009 | O'Neil | ................ | G05B 13/02 219/491 |
| 2010/0026225 A1* | 2/2010 | Kamei | ................ | B60L 3/0061 318/471 |
| 2010/0162706 A1* | 7/2010 | Sakai | ................ | E02F 9/128 60/706 |
| 2010/0212338 A1* | 8/2010 | Hermann | ................ | H01M 10/663 62/118 |
| 2011/0208363 A1* | 8/2011 | Vanderlaan | ................ | E02F 9/207 700/282 |
| 2011/0251746 A1* | 10/2011 | Wu | ................ | E02F 9/2075 701/22 |
| 2011/0308765 A1* | 12/2011 | Kumar | ................ | H01M 10/6565 165/47 |
| 2012/0130576 A1* | 5/2012 | Sugiyama | ................ | B60K 6/12 701/22 |
| 2012/0177470 A1* | 7/2012 | Ohhigashi | ................ | F02D 29/00 414/687 |
| 2012/0310489 A1* | 12/2012 | Hague | ................ | B60W 30/1846 701/50 |
| 2013/0110348 A1* | 5/2013 | Jinbo | ................ | E02F 9/26 701/36 |
| 2013/0275011 A1* | 10/2013 | Ota | ................ | B60L 58/26 701/50 |
| 2013/0311052 A1* | 11/2013 | Edamura | ................ | E02F 9/123 701/50 |
| 2014/0107881 A1 | 4/2014 | Sugiyama et al. | | |

FOREIGN PATENT DOCUMENTS

| | | |
|---|---|---|
| JP | 2009-052339 A | 3/2009 |
| JP | 2011-220069 A | 11/2011 |
| JP | 2012-021396 A | 2/2012 |
| JP | 2012-154092 A | 8/2012 |
| JP | 2012-211432 A | 11/2012 |

OTHER PUBLICATIONS

European Extended Search Report, European Application No. 15758713.0, dated Sep. 15, 2017, 8 pages.

* cited by examiner

FIG. 10C

| DISPLAY | 55a ▯▯▯▯▯ | 55b ▯▯▯▯■ | 55c ▯▯▯■■ | 55d ▯▯■■■ | 55e ▯■■■■ | 55f ■■■■■ |
|---|---|---|---|---|---|---|
| STATE | INSUFFICIENT WARMING UP | PROPER TEMPERATURE | PROPER TEMPERATURE | LEAN TO OVERHEATING | MAIN COMPONENTS OVERHEATED | OVERHEATED |
| SWIVELING OPERATION | OUTPUT LIMIT | NO LIMIT | NO LIMIT | NO LIMIT | OUTPUT LIMIT | STOP/SWIVELING IMPOSSIBLE |
| ALARM | NO | NO | NO | PRESENT (IN A CASE WHERE TEMPERATURE FURTHER INCREASES AFTER LIGHTING) | PRESENT | PRESENT |
| MESSAGE | CAPACITOR IS BEING WARMED UP (DURING IDLING) AND OUTPUT IS BEING LIMITED (MACHINE IS BEING OPERATED) | NO | NO | OUTPUT LIMITING NOTIFICATION (IN A CASE WHERE TEMPERATURE FURTHER INCREASES AFTER LIGHTING) | OUTPUT IS BEING LIMITED | HYBRID SYSTEM OVERHEATED |

SHOVEL WITH OUTPUT RESTRICTION BASED ON TEMPERATURE OF COMPONENTS

CROSS-REFERENCE TO RELATED APPLICATIONS

This application is a continuation application of a copending PCT patent application No. PCT/JP2015/056553 filed on Mar. 5, 2015, which claims priority to Japanese Patent Application No. 2014-044239 filed on Mar. 6, 2014, and Japanese Patent Application No. 2014-049501 filed on Mar. 12, 2014, which are incorporated by reference herein in its entirety.

BACKGROUND

Technical Field

Certain embodiments of the present invention relate to a shovel that includes a cooling system.

Description of Related Art

In the related art, a method for controlling an operation of a hybrid type shovel that uses an electric drive device unit and a hydraulic drive device unit as power sources of a rotation mechanism for rotating an upper swivel body has been proposed. In this operation control method, in a case where any one of temperatures of a storage device, an inverter/converter unit, and a motor unit that form the electric drive device unit is higher than a predetermined value when the upper swivel body is swiveled, a ratio of a torque command value for the electric drive device unit to a torque command value for the hydraulic drive device unit is lowered.

SUMMARY

According to an embodiment of the present invention, there is provided a shovel including: a lower traveling body; an upper swivel body that is rotatably mounted on the lower traveling body; an attachment that is configured by a boom, an arm, and an end attachment; an engine that is mounted on the upper swivel body; a motor generator that is able to assist the engine; a power storage system that is mounted on the upper swivel body; a swiveling motor that is driven by electric power from the motor generator and the power storage system; temperature detection units; and a control device, in which the control device switches a control mode in a case where at least one of a temperature relating to the motor generator, a temperature relating to the power storage system, and a temperature relating to the swiveling motor, detected by the temperature detection units is higher than a predetermined temperature.

According to the above-described units, it is possible to provide a shovel capable of appropriately performing temperature management of a portion where temperature increases.

BRIEF DESCRIPTION OF THE DRAWINGS

FIG. 1 is a side view of a hybrid shovel.

FIG. 2 is a block diagram illustrating a configuration of a drive system of the hybrid shovel in FIG. 1.

FIG. 3 is a block diagram illustrating a configuration of a power storage system.

FIG. 4 is a circuit diagram illustrating the power storage system.

FIG. 5 is a schematic diagram illustrating a controller.

FIG. 6 is a functional block diagram illustrating a configuration example of the controller.

FIG. 7 is a conceptual diagram illustrating control details of a swivel output control unit.

FIGS. 8A to 8F are diagrams illustrating correspondence maps indicating relationships between detection values of a temperature sensor and swivel output limiting values.

FIGS. 9A to 9C are diagrams illustrating variation in a first swivel output limiting value when a temperature of a motor generator varies between a high temperature side limiting start temperature and a stop temperature.

FIG. 10A is a diagram illustrating control details of a notification unit.

FIG. 10B is a diagram illustrating control details of the notification unit.

FIG. 10C is a diagram illustrating control details of the notification unit.

FIG. 11 is a diagram illustrating a configuration example of a cooling system.

FIG. 12 is a diagram illustrating operation conditions of a coolant pump.

FIG. 13 is a diagram illustrating stop conditions of the coolant pump.

FIG. 14 is a schematic view of an internal configuration of an inverter which is one of cooling targets of the cooling system.

FIG. 15 is a diagram illustrating temporal change in an ambient temperature and an IPM temperature inside a housing of the inverter.

DETAILED DESCRIPTION

According to the above-described operation control method in the related art, the ratio of the torque command values is simply lowered in a case where any one of the temperatures is higher than the predetermined value, but temperature management of a portion where temperature increases is not appropriately performed.

It is desirable to provide a shovel capable of appropriately performing temperature management of a portion where temperature increases.

FIG. 1 is a side view illustrating a hybrid shovel to which the invention is applied. On a lower traveling body 1 of the hybrid shovel, an upper swivel body 3 is mounted through a rotation mechanism 2. A boom 4 is attached to the upper swivel body 3. An arm 5 is attached to a tip of the boom 4, and a bucket 6 which is an end attachment is attached to a tip of the arm 5. The boom 4, the arm 5, and the bucket 6 form an excavating attachment which is an example of an attachment, and are hydraulically driven by a boom cylinder 7, an arm cylinder 8, and a bucket cylinder 9, respectively. A cabin 10 is provided on the upper swivel body 3, and a power source such as an engine is mounted therein.

FIG. 2 is a block diagram illustrating a configuration example of a drive system of a hybrid shovel according to an embodiment of the invention. In FIG. 2, a mechanical power system is indicated by a double line, a high pressure hydraulic line is indicated by a thick solid line, a pilot line is indicated by a broken line, and an electric drive control system is indicated by a fine solid line, respectively.

An engine 11 which is a mechanical drive unit and a motor generator 12 which is an assist drive unit are connected to two input shafts of a speed change gear 13. A main pump 14 which is a hydraulic pump and a pilot pump 15 are respectively connected to an output shaft of the speed change gear 13. A control valve 17 is connected to the main pump 14 through a high pressure hydraulic line 16.

The main pump 14 is a component of the hydraulic drive system in the shovel, and for example, is a swash plate type variable displacement hydraulic pump.

The control valve 17 is a hydraulic control device that controls the hydraulic system in the hybrid shovel. A right-side traveling hydraulic motor 1R and a left-side traveling hydraulic motor 1L which are hydraulic pressure actuators, the boom cylinder 7, the arm cylinder 8, and the bucket cylinder 9 are connected to the control valve 17 through the high pressure hydraulic line.

A power storage system 120 that includes a capacitor which is a power storage is connected to the motor generator 12 through the inverter 18 which is a motor generator control unit. Further, a swiveling motor 21 which is an electric operation element is connected to the power storage system 120 through the inverter 20 which is a motor generator control unit. A resolver 22, a mechanical brake 23, and a swiveling speed change gear 24 are connected to a rotating shaft 21A of the swiveling motor 21. Further, an operation device 26 is connected to the pilot pump 15 through a pilot line 25. The swiveling motor 21, the inverter 20, the resolver 22, the mechanical brake 23, and the swiveling speed change gear 24 form a load drive system.

The operation device 26 includes a lever 26A, a lever 26B, and a pedal 26C. The lever 26A, the lever 26B, and the pedal 26C are respectively connected to the control valve 17 and a pressure sensor 29 through hydraulic lines 27 and 28.

The pressure sensor 29 is a sensor that detects operation details of the operation device 26 in the unit of pressure, and outputs a detection value to a controller 30. Further, an engine sensor 29A is a sensor that detects data relating to the engine 11 such as a suction temperature of the engine 11 and an engine speed, or the like, and outputs a detection value to the controller 30.

Temperature sensors S1 to S6 which are temperature detection units are configured by thermistors, and outputs respective detection values to the controller 30. Specifically, the temperature sensor S1 detects a temperature (motor generator temperature) of the motor generator 12. The temperature sensor S2 detects a temperature (first inverter temperature) of the inverter 18. The temperature sensor S3 detects a temperature (swiveling motor temperature) of the swiveling motor 21. The temperature sensor S4 detects a temperature (second inverter temperature) of the inverter 20. The temperature sensor S5 detects a temperature (converter temperature) of a step-up/down converter 100 included in the power storage system 120. Further, the temperature sensor S6 detects a temperature (capacitor temperature) of the capacitor 19 included in the power storage system 120. For example, in the temperature sensors S1 and S3 that measure the temperatures of the motor generator 12 and the swiveling motor 21, a thermistor is attached to a stator which is a heat source. Further, in the temperature sensor S6 that measures the temperature of the capacitor 19, a thermistor is attached to an electrode of a capacitor cell which is a heat source. The temperature sensors S2, S4, and S5 that measure the temperatures of the inverter 18, the inverter 20, and the step-up/down converter 100, a thermistor may be attached to detect an ambient temperature inside a housing of each device without being directly attached to a heat source such as an IPM.

The controller 30 is a control device that performs a drive control of the shovel. In this embodiment, the controller 30 is configured by a CPU and an arithmetic processing unit including an internal memory, and realizes various functions by causing the CPU to execute a program stored in the internal memory.

For example, the controller 30 receives detection values from the pressure sensor 29, the engine sensor 29A, the temperature sensors S1 to S6, and the like to execute various calculations, and outputs various commands to the engine 11, the main pump 14, the inverters 18 and 20, the output unit 50, the cooling system 70, the power storage system 120, and the like.

The output unit 50 is a device that outputs a variety of information to an operator of the shovel. In this embodiment, the output unit 50 includes a liquid crystal display and a speaker provided in the cabin 10, and notifies the operator of an operating state of the shovel.

The cooling system 70 is a system that circulates a coolant in a cooling circuit to cool plural cooling targets including at least one electrical device and a power storage. In this embodiment, the cooling system 70 cools the motor generator 12, the speed change gear 13, the inverter 18, the capacitor 19, the inverter 20, the swiveling motor 21, the controller 30, and the step-up/down converter 100.

Figure 3:
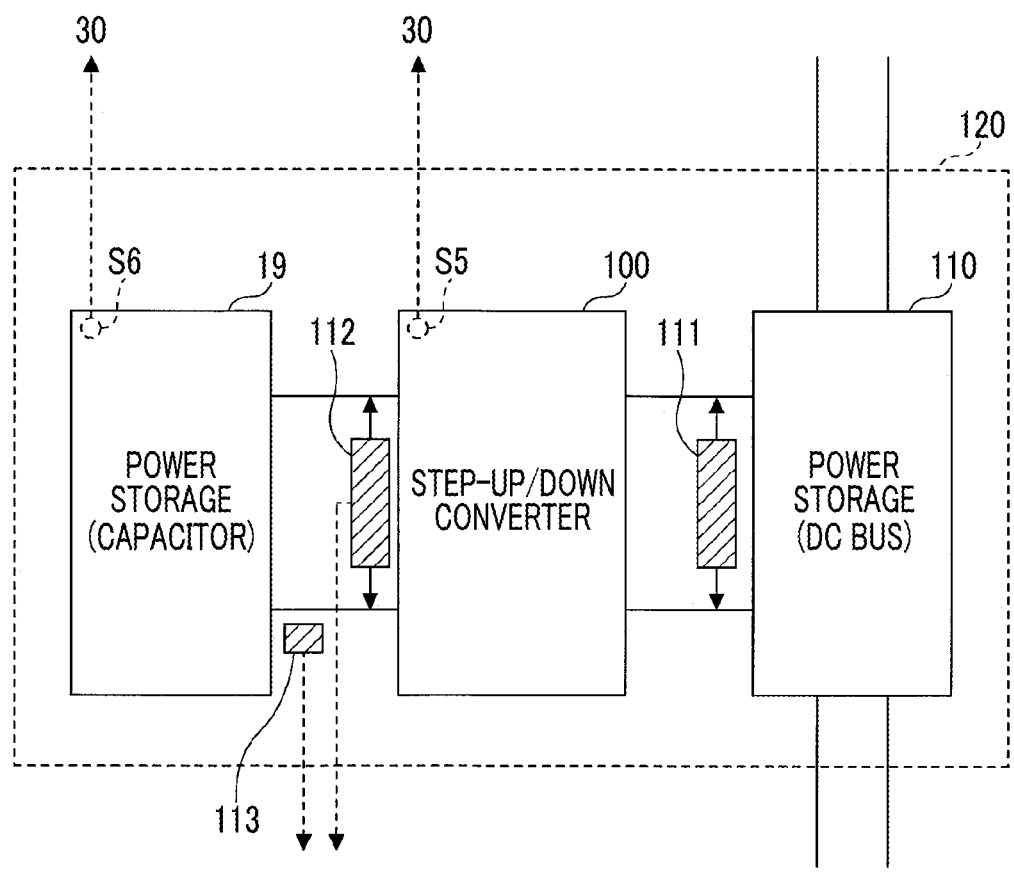

FIG. 3 is a block diagram illustrating a configuration of the power storage system 120. The power storage system 120 includes the capacitor 19 which is a first power storage, the step-up/down converter 100, and a DC bus 110 which is a bus line (second power storage). The first power storage is a device capable of charging and discharging electric power, and for example, includes a lithium-ion capacitor, an electric double layer capacitor, a lithium-ion battery, or the like.

The step-up/down converter 100 performs a control for switching a step-up operation and a step-down operation so that a DC bus voltage value is within a predetermined range according to operating states of the motor generator 12 and the swiveling motor 21. The voltage of the DC bus 110 is detected by the DC bus voltage detection unit 111. The DC bus 110 is provided between the inverters 18 and 20 and the step-up/down converter 100, and receives and transmits electric power between the capacitor 19, the motor generator 12, and the swiveling motor 21. Further, the temperature sensor S5 which is a temperature detection unit for detecting the temperature of the step-up/down converter 100 is provided in the step-up/down converter 100. The temperature sensor S5 and the temperature sensor S6 are configured by thermistors, for example, and output respective detection values to the controller 30. In addition, the temperature of the capacitor 19 may be indirectly detected through detection of the temperature of cooling water used for cooling of the capacitor 19. Furthermore, the temperature of the capacitor 19 may be indirectly detected through detection of a temperature a heating medium other than cooling water that affects the temperature of the capacitor 19.

The temperature sensor S5, the temperature sensor S6, the DC bus voltage detection unit 111, a capacitor voltage detection unit 112, and a capacitor current detection unit 113 output detection values to the controller 30.

The controller 30 converts a signal supplied from the pressure sensor 29 into a speed command, and performs a drive control of the swiveling motor 21. In this case, the signal supplied from the pressure sensor 29 corresponds to a signal indicating a manipulated variable in a case where the operation device 26 is operated to swivel the rotation mechanism 2.

The controller 30 performs an operation control of the motor generator 12 (switching of an electric (assist) operation or a power generating operation), and performs a charge/discharge control of the capacitor 19 based on a drive control of the step-up/down converter 100 which is a step-up/down control unit. The controller 30 performs a switching control of the step-up operation and the step-down operation of the step-up/down converter 100 based on a charging state of the capacitor 19, an operating state (assist operation or power generating operation) of the motor generator 12, and an operating state (power running operation or regenerative operation) of the swiveling motor 21, and thus, performs the charge/discharge control of the capacitor 19.

The switching control of the step-up operation and the step-down operation of the step-up/down converter 100 is performed based on a DC bus voltage detected by the DC bus voltage detection unit 111, a capacitor voltage value detected by the capacitor voltage detection unit 112, and a capacitor current value detected by the capacitor current detection unit 113.

In the above-described configuration, electric power generated by the motor generator 12 which is an assist motor may be supplied to the DC bus 110 of the power storage system 120 through the inverter 18, and then, may be supplied to the capacitor 19 through the step-up/down converter 100, or may be supplied to the swiveling motor 21 through the inverter 20. Further, regenerated power which is regenerated by the regenerative operation of the swiveling motor 21 is supplied to the DC bus 110 of the power storage system 120 through the inverter 20, and then, may be supplied to the capacitor 19 through the step-up/down converter 100, or may be supplied to the motor generator 12 through the inverter 18. In addition, electric power stored in the capacitor 19 may be supplied to at least one of the motor generator 12 and the swiveling motor 21 through the step-up/down converter 100 and the DC bus 110.

Figure 4:
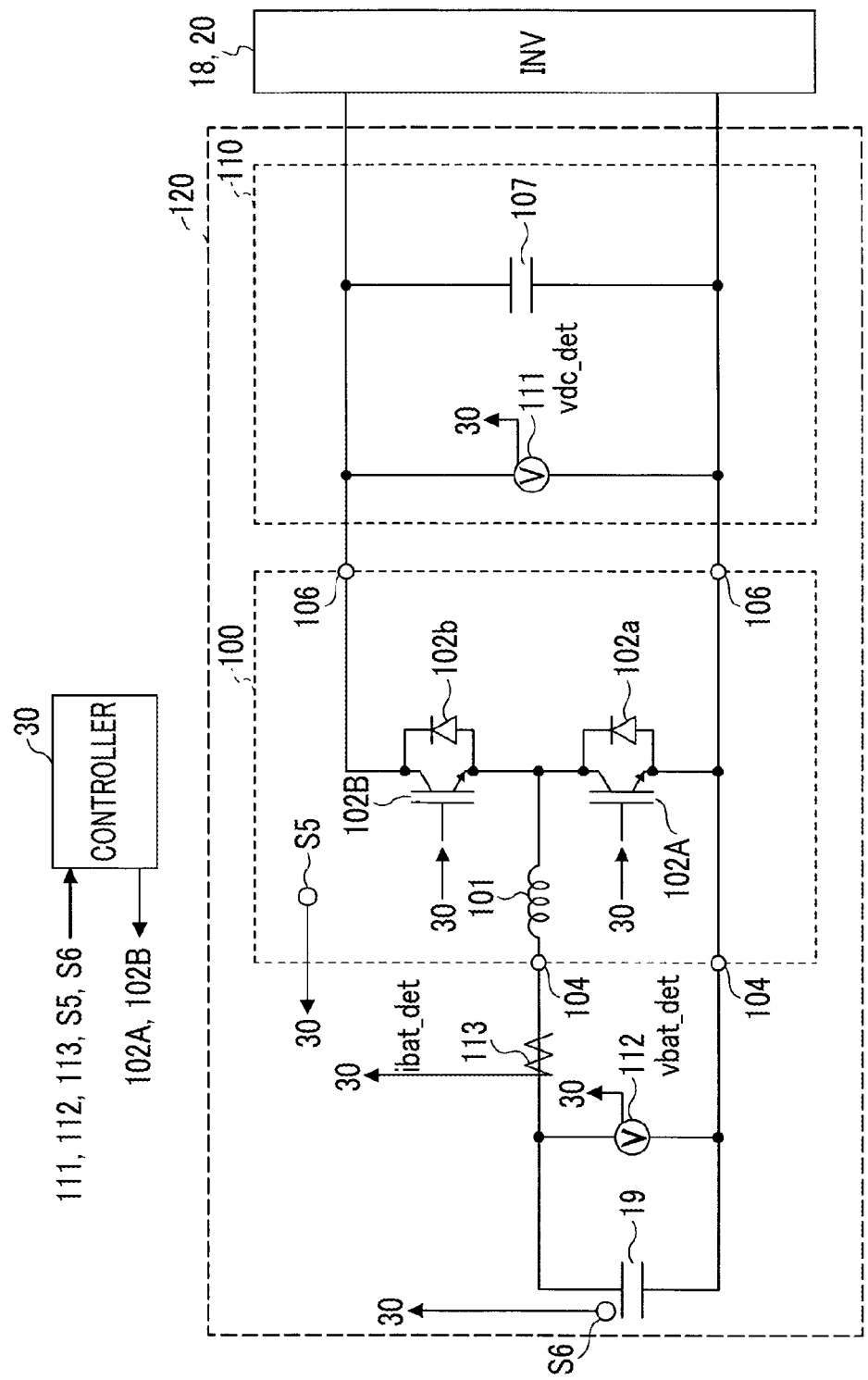

FIG. 4 is a circuit diagram illustrating the power storage system 120. The step-up/down converter 100 includes a reactor 101, a step-up IGBT 102A, a step-down IGBT 102B, a power source connection terminal 104 for connection of the capacitor 19, a pair of output terminals 106 for connection of the inverters 18 and 20, and a smoothing condenser 107 connected in parallel with the pair of output terminals 106. The pair of output terminal 106 of the step-up/down converter 100 and the inverters 18 and 20 are connected to each other through the DC bus 110.

An end of the reactor 101 is connected to an intermediate point of the step-up IGBT 102A and the step-down IGBT 102B, and the other end thereof is connected to the power source connection terminal 104. The reactor 101 is provided to supply an induced electromotive force according to on/off of the step-up IGBT 102A to the DC bus 110.

The step-up IGBT 102A and the step-down IGBT 102B are driven by applying a PWM voltage to a gate terminal thereof by the controller 30. Diodes 102a and 102b which are rectifying elements are connected to the step-up IGBT 102A and the step-down IGBT 102B in parallel.

The capacitor 19 may be a power storage capable of being charged and discharged so that reception and transmission of electric power can be performed between the capacitor 19 and the DC bus 110 through the step-up/down converter 100. In FIG. 4, the capacitor 19 is shown as the power storage, but a secondary battery capable of being charged and discharged such as a lithium-ion battery, a lithium-ion capacitor, or a power source of a different type in which electric power reception and transmission can be performed may be used as the power storage.

The power source connection terminal 104 and the output terminal 106 may be terminals to which the capacitor 19 and the inverters 18 and 20 can be connected. The capacitor voltage detection unit 112 that detects a capacitor voltage is connected between the pair of power source connection terminals 104. The DC bus voltage detection unit 111 that detects a DC bus voltage is connected between the pair of output terminals 106.

The capacitor voltage detection unit 112 detects a voltage value (vbat_det) of the capacitor 19. The DC bus voltage detection unit 111 detects a voltage (hereinafter, referred to as a DC bus voltage: vdc_det) of the DC bus 110. The smoothing condenser 107 is a power storage element that is disposed between a positive electrode terminal and a negative electrode terminal of the output terminal 106 and smoothes the DC bus voltage. The voltage of the DC bus 110 is maintained as a predetermined voltage by the smoothing condenser 107. The capacitor current detection unit 113 is a detection unit that detects a value of electric current flowing in the capacitor 19, and includes a resistor for electric current detection. That is, the capacitor current detection unit 113 detects an electric current value (ibat_det) in the capacitor 19.

Figure 5:
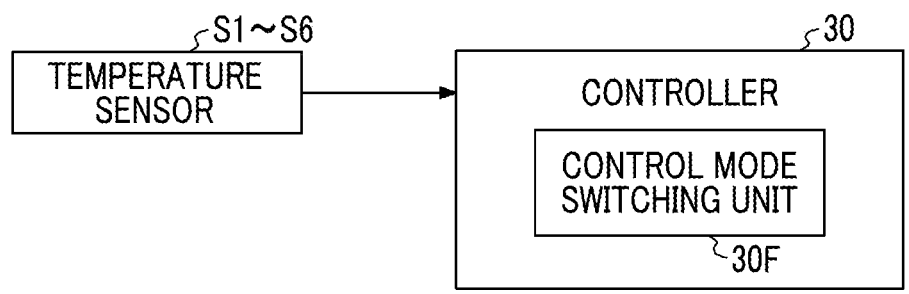

Next, an outline of the controller 30 will be described with reference to FIG. 5. In this embodiment, the controller 30 includes a control mode switching unit 30F. The control mode switching unit 30F switches a control mode of the shovel based on each output of the temperature sensors S1 to S6 which are temperature detection units. For example, the control mode switching unit 30F monitors a motor generator temperature, a first inverter temperature, a swiveling motor temperature, a second inverter temperature, a step-up/down converter temperature, and a capacitor temperature, and switches the control mode of the shovel in a case where at least one thereof exceeds a predetermined temperature. For example, the control mode switching unit 30F switches a normal swiveling mode in which a movement of the swiveling motor 21 is not limited into a swivel limiting mode in which an output of the swiveling motor 21 is limited. Alternatively, the control mode switching unit 30F switches a coolant stop mode in which an operation of the coolant pump that forms the cooling system 70 is stopped into a coolant pump operating mode in which the coolant pump is operated.

Further, the control mode switching unit 30F may return the control mode of the shovel to an original control mode in a case where all of the motor generator temperature, the first inverter temperature, the swiveling motor temperature, the second inverter temperature, the step-up/down converter temperature, and the capacitor temperature become equal to or lower than the predetermined temperature after the control mode is switched. For example, the control mode switching unit 30F may switch the swivel limiting mode into a normal swiveling mode. Alternatively, the control mode switching unit 30F may switch the coolant pump operating mode into the coolant pump stop mode.

Figure 6:
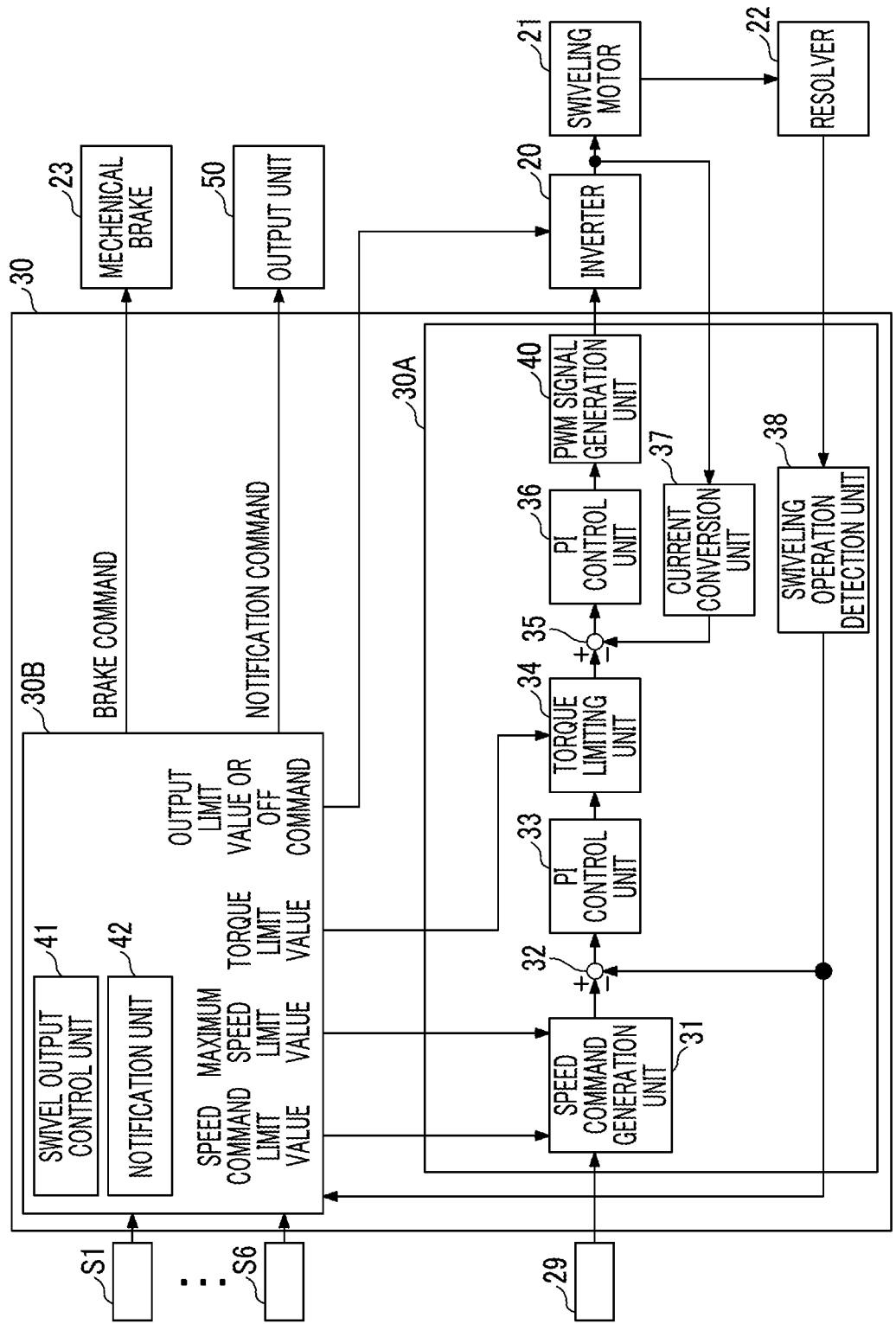

FIG. 6 shows a functional element used when the controller 30 performs a drive control of the swiveling motor 21. In this embodiment, the controller 30 mainly includes a swivel control unit 30A and a swivel limiting control unit 30B.

The swivel control unit 30A includes a speed command generation unit 31, a subtracter 32, a PI control unit 33, a torque limiting unit 34, a subtracter 35, a PI control unit 36, a current conversion unit 37, a swiveling operation detection unit 38, and a PWM signal generation unit 40.

The speed command generation unit 31 generates a speed command value based on an electric signal input from the pressure sensor 29. Further, the speed command generation unit 31 limits, using a speed command limit value input from the swivel limiting control unit 30B, the speed command value to be equal to or smaller than the speed command limit value. Specifically, if the generated speed command value is equal to or greater than the speed command limit value, the speed command limit value is employed as the speed command value. If the generated speed command value is smaller than the speed command limit value, the speed command value is employed as it is. In addition, the speed command generation unit 31 outputs the employed speed command value to the subtracter 32.

The subtracter 32 outputs a difference between the speed command value and a value of a current swivel speed to the PI control unit 33. The value of the current swivel speed is a value calculated by the swiveling operation detection unit 38, for example. The swiveling operation detection unit 38 calculates a swivel speed value based on a change of a rotating position of the swiveling motor 21, and outputs the result to the subtracter 32. Further, the change of the rotating position of the swiveling motor 21 is detected by the resolver 22.

The PI control unit 33 executes a PI control based on the difference input from the subtracter 32. Specifically, the PI control unit 33 generates a torque current command value so that the value of the current swivel speed comes close to the speed command value. Further, the PI control unit 33 outputs the generated torque current command value to the torque limiting unit 34.

The torque limiting unit 34 limits, using a torque limit value input from the swivel limiting control unit 30B, the torque current command value input from the PI control unit 33 to be equal to or smaller than the torque limit value. Specifically, if the torque current command value is equal to or greater than the torque limit value, the torque limit value is employed as the torque current command value, and if the torque current command value is smaller than the torque limit value, the torque current command value is employed as it is. Further, the torque limiting unit 34 outputs the employed torque current command value to the subtracter 35.

The subtracter 35 outputs a difference between the torque current command value and a value of a current torque current to the PI control unit 36. The value of the current torque current is a value calculated by the current conversion unit 37, for example. The current conversion unit 37 detects a value of a motor-drive electric current flowing in the swiveling motor 21, converts the detected motor-drive electric current value into a value capable of being compared with the torque current command value, and outputs the result to the subtracter 35.

The PI control unit 36 executes a PI control based on the difference input from the subtracter 35. Specifically, the PI control unit 36 generates a drive command value for driving the inverter 20 so that the value of the current torque current comes close to the torque current command value. Further, the PI control unit 36 outputs the generated drive command value to the PWM signal generation unit 40.

The PWM signal generation unit 40 generates a PWM signal for switching-controlling a transistor of the inverter 20 based on the drive command value input from the PI control unit 36, and outputs the generated PWM signal to the inverter 20.

The swivel limiting control unit 30B is an example of the control mode switching unit 30F, and mainly includes a swivel output control unit 41 and a notification unit 42.

The swivel output control unit 41 is a functional element that controls an output of the swiveling motor 21 according to temperatures of components (hereinafter, referred to as "swiveling associated components") relating to the swiveling motor 21. In this embodiment, the swiveling associated components include high voltage parts such as the motor generator 12, the inverter 18, the swiveling motor 21, the inverter 20, the step-up/down converter 100, and the capacitor 19. Further, the temperatures of the swiveling associated components include a temperature relating to the motor generator 12, a temperature relating to the power storage system 120, and a temperature relating to the swiveling motor 21. The temperature relating to the motor generator 12 includes a temperature of the motor generator 12 and a temperature of the inverter 18, the temperature relating to the power storage system 120 includes a temperature of the capacitor 19 and a temperature of the step-up/down converter 100, and the temperature relating to the swiveling motor 21 includes a temperature of the swiveling motor 21 and a temperature of the inverter 20.

Further, the swivel output control unit 41 controls an output of the swiveling motor 21 using a swivel output limiting value derived based on each detection value of the temperature sensors S1 to S6. The swivel output limiting value is a value used for limiting the output of the swiveling motor 21, and for example, may have a form of a speed command limit value with respect to the speed command generation unit 31, a maximum speed limit value with respect to the speed command generation unit 31, a torque limit value with respect to the torque limiting unit 34, or an output limit value with respect to the inverter 20. The swivel output limiting value shows that swivel output limiting becomes smoother as the value becomes larger and the swivel output limiting becomes more stringent as the value becomes smaller.

Further, in this embodiment, the swivel output control unit 41 does not update the swivel output limiting value during swiveling. Thus, it is possible to prevent deterioration of an operation feeling. Specifically, the swivel output control unit 41 controls an output of the swiveling motor 21 using a swivel output limiting value when the swiveling is stopped immediately before swiveling acceleration, and maintains the swivel output limiting value during swiveling.

Figure 7:
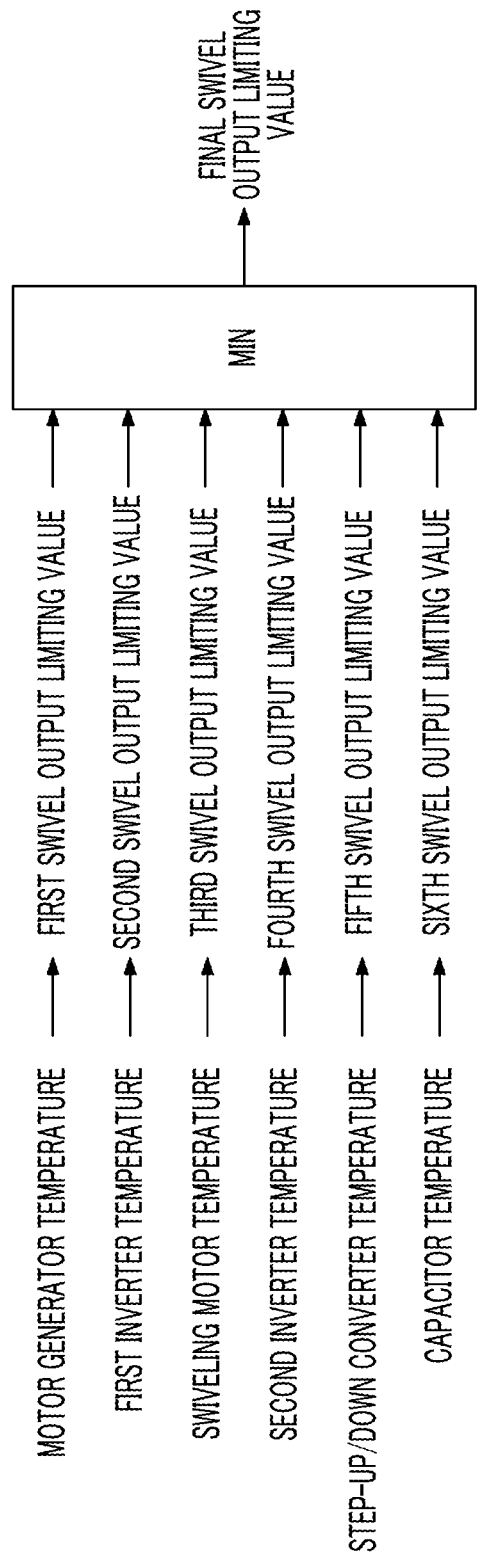

FIG. 7 is a conceptual diagram illustrating details of an output control of the swiveling motor 21 using the swivel output control unit 41. Specifically, the swivel output control unit 41 derives a first swivel output limiting value from the temperature of the motor generator 12 (motor generator temperature) detected by the temperature sensor S1. Further, the swivel output control unit 41 derives a second swivel output limiting value from the temperature of the inverter 18 (first inverter temperature) detected by the temperature sensor S2. Further, the swivel output control unit 41 derives a third swivel output limiting value from the temperature of the swiveling motor 21 (swiveling motor temperature) detected by the temperature sensor S3, and derives a fourth swivel output limiting value from the temperature of the inverter 20 (second inverter temperature) detected by the temperature sensor S4. Further, the swivel output control unit 41 derives a fifth swivel output limiting value from the temperature of the step-up/down converter 100 (step-up/down converter temperature) detected by the temperature sensor S5. Further, the swivel output control unit 41 derives a sixth swivel output limiting value from the temperature of the capacitor 19 (capacitor temperature) detected by the temperature sensor S6. The swivel output control unit 41 may derive the sixth swivel output limiting value from the temperature of cooling water used for cooling of the capacitor 19, instead of the derivation of the sixth swivel output limiting value from the capacitor temperature. In this case, the following "capacitor temperature" is read as "cooling water temperature".

Further, the swivel output control unit 41 reads a minimum value among the first to sixth swivel output limiting values as a final swivel output limiting value.

Then, the swivel output control unit 41 outputs an output limit value corresponding to the final swivel output limiting value to the inverter 20. The output limit value is a value relating to electric power [kW], electric current [A], voltage [V], or the like. The swivel output control unit 41 may output a speed command limit value corresponding to the final swivel output limiting value to the speed command generation unit 31, may output to a torque limit value corresponding to the final swivel output limiting value to the torque limiting unit 34, or may output a maximum speed limit value corresponding to the final swivel output limiting value to the speed command generation unit 31, in addition to or instead of the output limit value. The speed command limit value is mainly used for limiting the speed command value and for limiting the torque electric current command value generated by the PI control unit 33. The torque limit value is mainly used for limiting a maximum value of a swiveling acceleration, and the maximum speed limit value is mainly used for limiting a maximum value of a swivel speed.

Further, in a case where the swivel output control unit 41 reduces the final swivel output limiting value to limit the output of the swiveling motor 21, the swivel output control unit 41 may limit an output of the main pump 14 at the same time. By limiting a movement of an attachment according to limiting a movement of the rotation mechanism 2, it is possible to prevent deterioration of an operation feeling such as the movement of the rotation mechanism 2 becoming dull.

FIGS. 8A to 8F show correspondence maps indicating relationships between detection values of the temperature sensors S1 to S6 and the first to sixth swivel output limiting values. Specifically, the correspondence map of FIG. 8A indicates a relationship between the motor generator temperature and the first swivel output limiting value, and the correspondence map of FIG. 8B indicates a relationship between the first inverter temperature and the second swivel output limiting value. Further, the correspondence map of FIG. 8C indicates a relationship between the swiveling motor generator temperature and the third swivel output limiting value, and the correspondence map of FIG. 8D indicates a relationship between the second inverter temperature and the fourth swivel output limiting value. In addition, the correspondence map of FIG. 8E indicates a relationship between the step-up/down converter temperature and the fifth swivel output limiting value, and the correspondence map of FIG. 8F indicates a relationship between the capacitor temperature and the sixth swivel output limiting value. The correspondence maps shown in FIGS. 8A to 8F are stored in the internal memory of the controller 30, for example. The swivel output control unit 41 derives the first to sixth swivel output limiting values corresponding to the motor generator temperature, the first inverter temperature, the swiveling motor temperature, the second inverter temperature, the step-up/down converter temperature, and the capacitor temperature, with reference to the correspondence maps shown in FIGS. 8A to 8F.

Figure 8A:
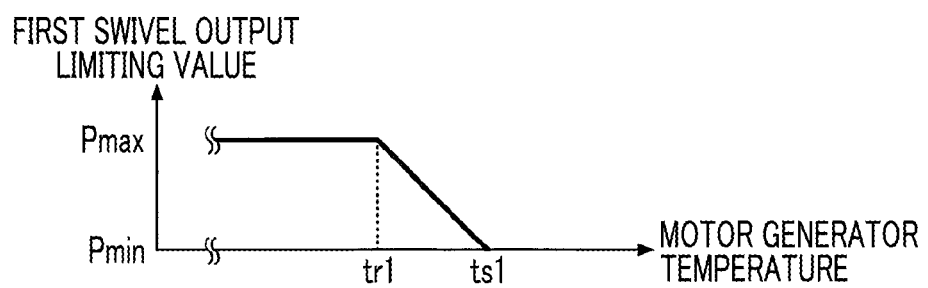
Figure 8B:
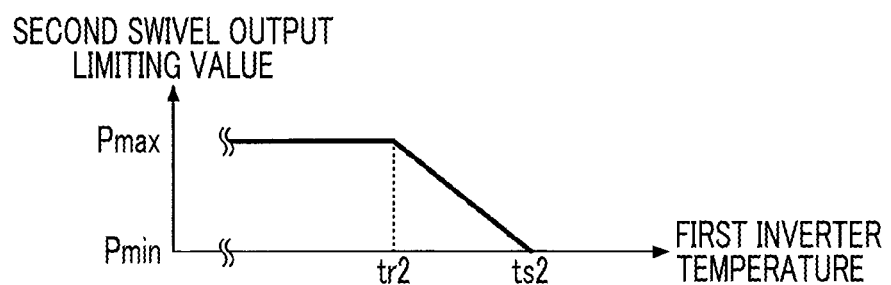
Figure 8C:
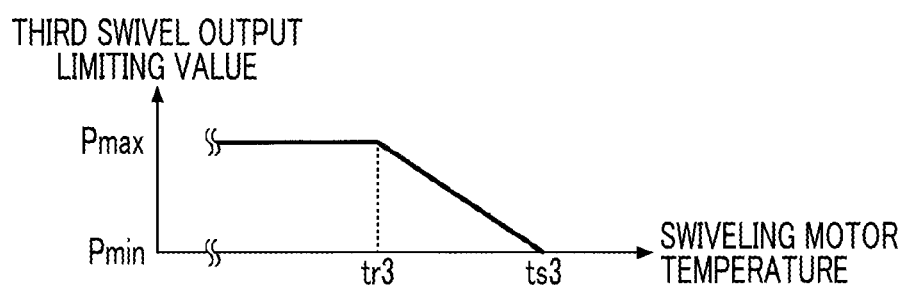
Figure 8D:
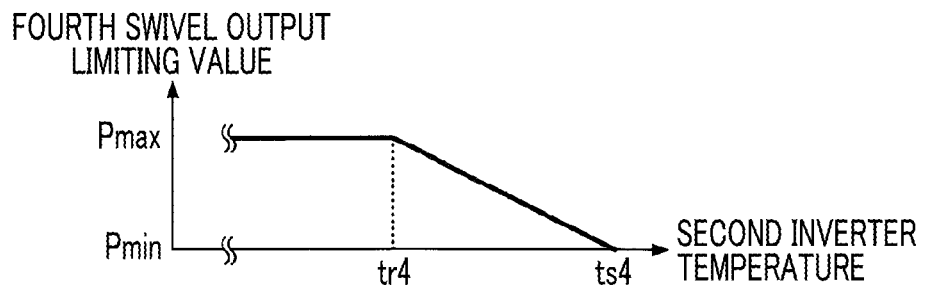
Figure 8E:
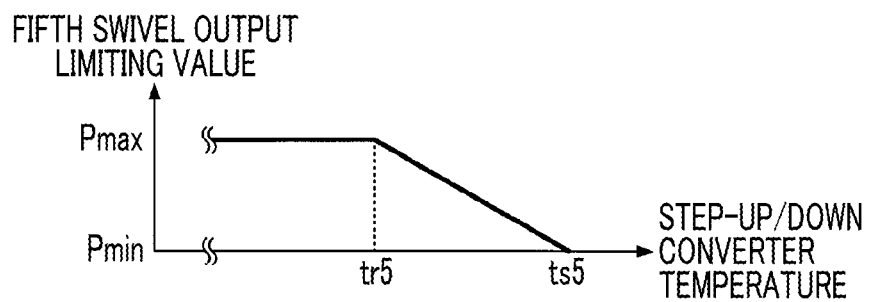
Figure 8F:
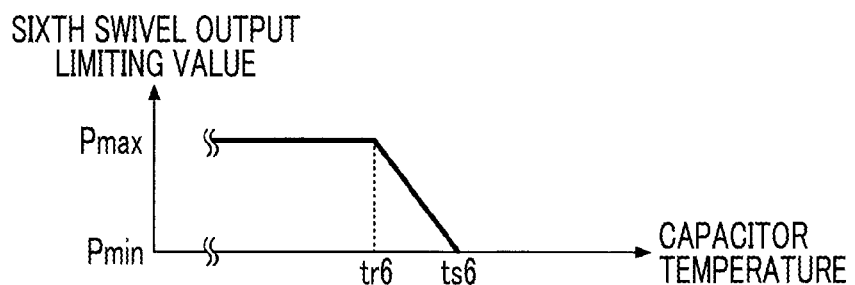

Specifically, as shown in FIG. 8A, if the motor generator temperature is equal to or lower than a predetermined high temperature side limiting start temperature tr1, the swivel output control unit 41 derives a maximum value Pmax as the first swivel output limiting value. The high temperature side limiting start temperature tr1 is a threshold value for determining whether swivel output limiting due to overheating of the motor generator 12 is necessary. Further, a control mode of the swiveling motor 21 using a final swivel output limiting value which is the maximum value Pmax corresponds to a normal swiveling mode, and a control mode of the swiveling motor 21 using a final swivel output limiting value which is smaller than the maximum value Pmax corresponds to a swivel limiting mode.

Further, if the motor generator temperature exceeds the high temperature side limiting start temperature tr1 and gradually increases, the swivel output control unit 41 gradually lowers a value derived as the first swivel output limiting value from the maximum value Pmax. Thus, it is possible to prevent the swiveling motor 21 from being operated at a maximum output in a state where the motor generator 12 is overheated. Further, when the motor generator temperature reaches a predetermined stop temperature ts1, the swivel output control unit 41 derives a minimum value Pmin (for example, value zero) as the first swivel output limiting value. The stop temperature ts1 is a threshold value for determining whether the stop of the swiveling motor 21 is necessary, which is a temperature at which there is a concern that if the motor generator 12 is continuously operated to further increase the motor generator temperature, the temperature causes breakdown of the motor generator 12.

By gradually lowering the first swivel output limiting value, it is possible to prevent the movement of the swiveling motor 21 from rapidly changing. Further, in order to prevent the movement of the swiveling motor 21 from rapidly changing, it is effective to gradually lower the first swivel output limiting value over a broader temperature range. However, in a configuration in which the first swivel output limiting value is gradually lowered over an excessively broad temperature range, for example, in a configuration in which the high temperature side limiting start temperature tr1 is set to be excessively low, the movement of the swiveling motor 21 is limited even though the motor generator temperature is relatively low. Thus, it is preferable to appropriately set the high temperature side limiting start temperature tr1 in consideration of balance between operability of the shovel and overheating preventive performance of the motor generator 12.

Further, in a case where the minimum value Pmin is derived as the first swivel output limiting value, the swivel output control unit 41 derives the minimum value Pmin as a final swivel output limiting value regardless of the sizes of the second to sixth swivel output limiting values. The minimum value Pmin is a minimum value from which the final swivel output limiting value can be acquired. In this case, the swivel output control unit 41 outputs an off command to the inverter 20 to stop the output of the inverter 20, and outputs a brake command to the mechanical brake 23 to generate a braking force using the mechanical brake 23. As a result, the swiveling motor 21 is subject to forcible cutoff of electric current supply from the inverter 20, and is forcibly braked by the mechanical brake 23, regardless of whether the swiveling motor 21 is during swiveling or not.

Further, as shown in FIGS. 8B to 8F, the swivel output control unit 41 derives the second to sixth swivel output limiting values, with respect to the first inverter temperature, the swiveling motor temperature, the second inverter temperature, the step-up/down converter temperature, and the capacitor temperature, in a similar way to the first swivel output limiting value.

Changes in the second to sixth swivel output limiting values are different from the change in the first swivel output limiting value in that high temperature side limiting start temperatures tr2 to tr6 are different from the high temperature side limiting start temperature tr1 and stop temperatures ts2 to ts6 are different from the stop temperature ts1. Further, the changes in the second to sixth swivel output limiting values are different from the change in the first swivel output limiting value in that lowering rates (gradients) of the second to sixth swivel output limiting values when the respective temperatures increase from the high temperature side limiting start temperatures tr2 to tr6 to the stop temperatures ts2 to ts6 are different from that of the first swivel output limiting value. This is because a warm side and a cold side vary for each swiveling associated component. However, the changes of the second to sixth swivel output limiting values are the same as the change of the first swivel output limiting value in that if respective temperatures are equal to or lower than the high temperature side limiting start temperatures tr2 to tr6, the second to sixth swivel output limiting values become the maximum value Pmax and in a case where the respective temperatures reach the stop temperatures ts2 to ts6, the second to sixth swivel output limiting values become the minimum value Pmin (value zero). Further, this is the same as change in the first swivel output limiting value in that the second to sixth swivel output limiting values gradually decrease when each temperature increases from the high temperature side limiting start temperatures tr2 to tr6 to the stop temperatures ts2 to ts6. In this embodiment, various correspondence maps are registered in advance so that the lowering rate (gradient) of the fourth swivel output limiting value relating to the second inverter temperature among the six swivel output limiting values becomes a minimum. Thus, in this embodiment, the controller 30 can smoothen a change in the movement of the swiveling motor 21 depending on a temperature change of the inverter 20 compared with a change in the movement of the swiveling motor 21 depending on a temperature change of another swiveling associated component.

Figure 9A:
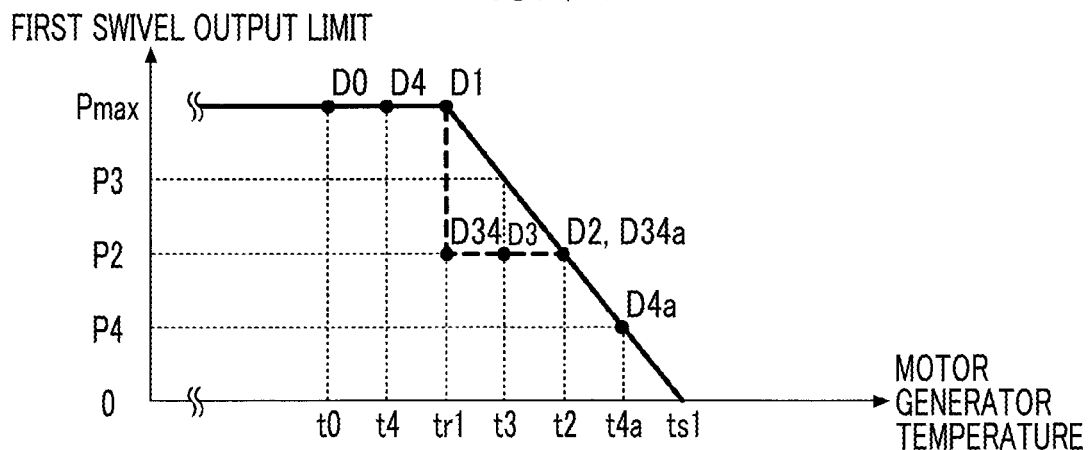
Figure 9B:
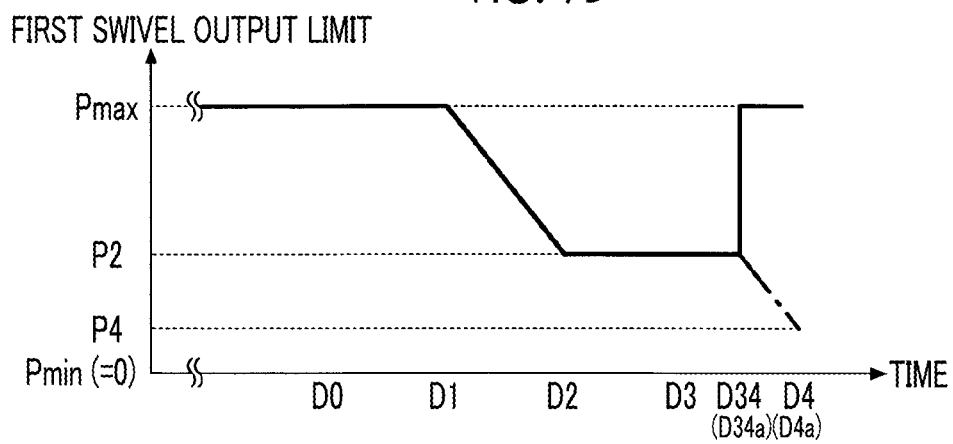
Figure 9C:
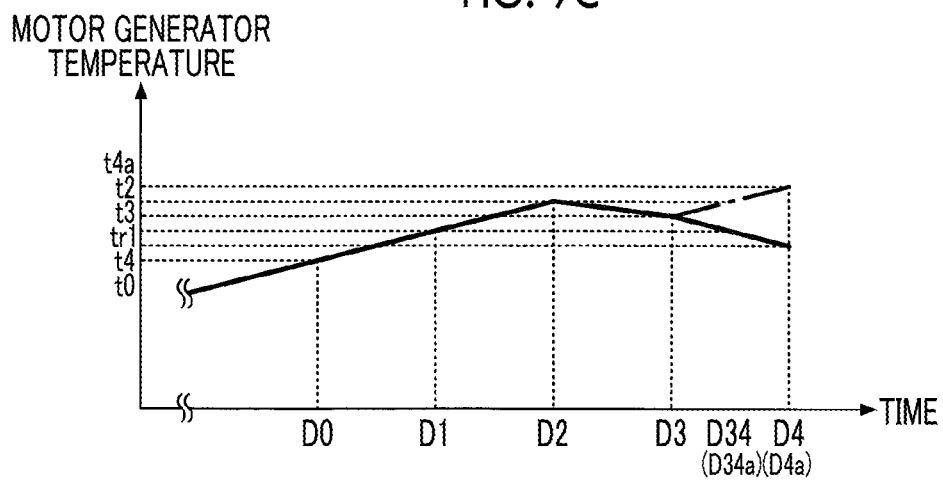

Then, a change in the first swivel output limiting value when the motor generator temperature vertically varies between the high temperature side limiting start temperature tr1 and the stop temperature ts1 will be described with reference to FIGS. 9A to 9C. FIG. 9A is a diagram illustrating a relationship between the first swivel output limiting value and the motor generator temperature in which a longitudinal axis represents the first swivel output limiting value and a transverse axis represents the motor generator temperature. Further, black circles in FIG. 9A represent correspondence relationships between motor generator temperatures at time points D0 to D4 and the first swivel output limiting value. FIG. 9B is a diagram illustrating temporal change in the first swivel output limiting value in which a longitudinal axis represents the first swivel output limiting value and a transverse axis represents a time axis. Further, FIG. 9C is a diagram illustrating temporal change in the motor generator temperature in which a longitudinal axis represents the motor generator temperature and a transverse axis represents a time axis. The time axis of FIG. 9B and a time axis of FIG. 9C are common. FIGS. 9A to 9C show the change of the first swivel output limiting value when the motor generator temperature varies, but the same description may be applied to the changes of the second to the sixth swivel output limiting values when the first inverter temperature, the swiveling motor temperature, the second inverter temperature, the step-up/down converter temperature, and the capacitor temperature respectively vary.

Specifically, FIGS. 9A to 9C show that the motor generator temperature is t0 at a time point D0 and the first swivel output limiting value is the maximum value Pmax.

Further, FIGS. 9A to 9C show that if the motor generator temperature increases with the lapse of time, the first swivel output limiting value changes as the maximum value Pmax, as indicated by solid lines of FIGS. 9A and 9B.

Further, FIGS. 9A to 9C show that if the motor generator temperature exceeds the high temperature side limiting start temperature tr1 at a time point D1 and continuously increases, the first swivel output limiting value is gradually lowered from the maximum value Pmax, and if the motor generator temperature reaches a temperature t2 at a time point D2, the first swivel output limiting value reaches a value P2 (<Pmax).

Further, FIGS. 9A to 9C show that when the motor generator temperature reversely decreases at the time point D2 and decreases to a temperature t3 at a time point D3, the first swivel output limiting value changes along a broken line in FIG. 9A without along the solid line in FIG. 9A. Specifically, FIGS. 9A to 9C show that the first swivel output limiting value is maintained as the value P2 without increasing to a value P3 (>P2).

Further, FIGS. 9A to 9C show that in a case where the motor generator temperature becomes lower than the temperature t3 and continuously decreases, until the motor generator temperature reaches the high temperature side limiting start temperature tr1 at a time point D34, the first swivel output limiting value maintains the value P2. Further, FIGS. 9A to 9C show that if the motor generator temperature becomes lower than the high temperature side limiting start time tr1 at the time point D34, the first swivel output limiting value returns to the maximum value Pmax. Furthermore, FIGS. 9A to 9C show that even though the motor generator temperature becomes lower than the high temperature side limiting start temperature tr1 and continuously decreases to a temperature t4 until the motor generator temperature reaches the time point D4, the first swivel output limiting value is maintained as the maximum value Pmax.

Further, FIGS. 9A to 9C show that even in a case where the motor generator temperature reversely increases again after decrease to the temperature t3 at the time point D3 (see a single-dot chain line of FIG. 9C), the first swivel output limiting value changes along the broken line of FIG. 9A without along the solid line of FIG. 9A. Specifically, FIGS. 9A to 9C show that the first swivel output limiting value is maintained as the value P2 without increasing to the value P3 (>P2).

Further, FIGS. 9A to 9C show that in a case where the motor generator temperature further continuously increases, until the motor generator temperature reaches the temperature t2 at the time point D34a, the first swivel output limiting value maintains the value P2. Further, FIGS. 9A to 9C show that in a case where the motor generator temperature exceeds the temperature t2 and continuously increases, the first swivel output limiting value changes again along the solid line of FIG. 9A, and if the motor generator temperature reaches a temperature t4a at a time point D4a, the first swivel output limiting value reaches a value P4 (<P2) (see a single-dot chain line of FIG. 9B).

In this way, in a case where the motor generator temperature that exceeds the high temperature side limiting start temperature tr1 to increase reversely decreases between the high temperature side limiting start temperature tr1 and the stop temperature ts1, the swivel output control unit 41 maintains the first swivel output limiting value at the time of reversal. This is because if the swivel output limiting value is increased immediately depending on reverse decrease of the motor generator temperature, there is a risk that a reverse increase of the motor generator temperature occurs. Specifically, until the motor generator temperature becomes lower than the high temperature side limiting start temperature tr1 or exceeds the temperature t2 at the time of reversal, the swivel output control unit 41 maintains the first swivel output limiting value at the time of reversal. As a result, the swivel output control unit 41 can prevent the movement of the swiveling motor 21 from being unstable due to hunting of the first swivel output limiting value. Furthermore, the swivel output control unit 41 can prevent the acceleration of the upper swivel body 3 from increasing against an intention of an operator.

Here, returning to FIG. 6, the notification unit 42 of a swivel limiting control unit 30B will be described. The notification unit 42 is a functional element that notifies an operator of information relating to a swiveling associated component. The notification unit 42 outputs a notification command to the output unit 50 in a case where a predetermined condition is satisfied, and outputs information relating to the swiveling associated component to the output unit 50.

Specifically, the notification unit 42 determines details to be output from the output unit 50 according to the temperature of the swiveling associated component. In this embodiment, the notification unit 42 determines display details to be displayed on the liquid crystal display provided in the cabin 10 according to detection values of the temperature sensors S1 to S6. Further, the notification unit 42 outputs an alarm through the speaker provided in the cabin 10 as a sound output.

Figure 10A:
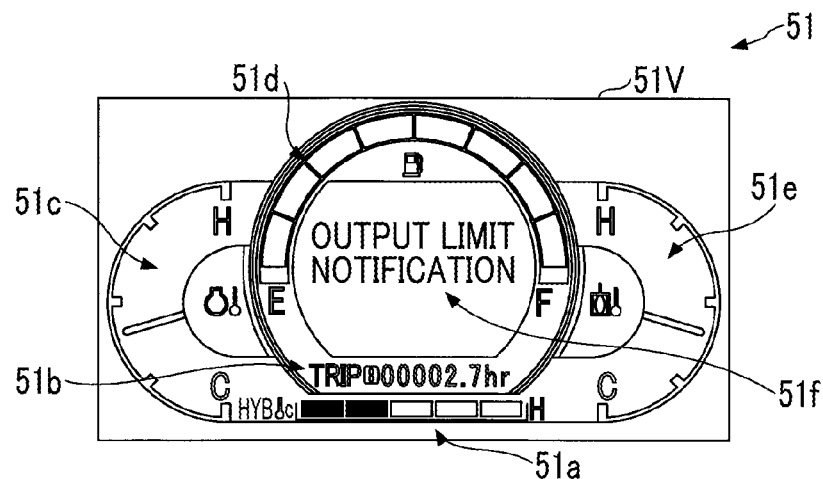
Figure 10B:
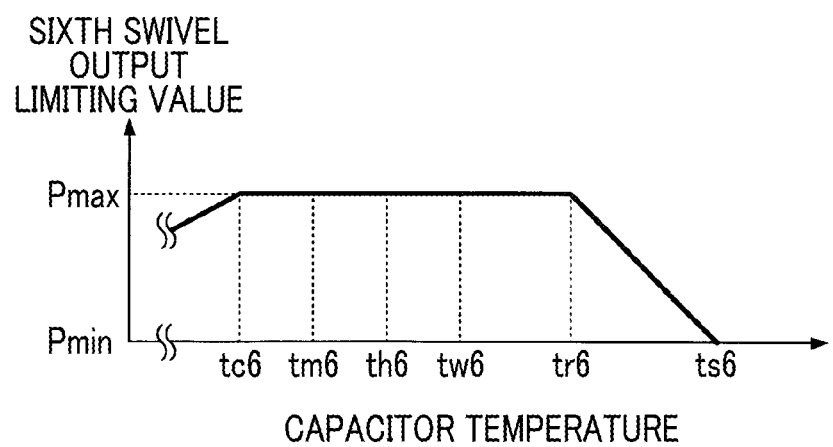

FIGS. 10A to 10C are diagrams illustrating control details of the notification unit 42. Specifically, FIG. 10A is a diagram illustrating an example of a display screen 51V of the liquid crystal display 51 that forms the output unit 50. FIG. 10B is a correspondence map illustrating a relationship between the capacitor temperature and the sixth output limiting value, which corresponds to FIG. 8F. Further, FIG. 10C is a diagram illustrating display details of a high voltage part temperature display region 51a displayed on the display screen 51V.

As shown in FIG. 10A, the display screen 51V of the liquid crystal display 51 mainly includes the high voltage part temperature display region 51a, an engine operation time display region 51b, a cooling water temperature display region 51c, a remaining fuel amount display region 51d, a working oil temperature display region 51e, an alarm display region 51f.

The high voltage part temperature display region 51a is a region where a temperature state of a high voltage part is displayed as an image, and the engine operation time display region 51b is a region where an accumulated operation time of the engine 11 is displayed as an image. Further, the cooling water temperature display region 51c is a region where a current temperature state of cooling water of an engine is displayed as an image, and the remaining fuel amount display region 51d is a region where a remaining amount state of fuel stored in a fuel tank is displayed as an image. Furthermore, the working oil temperature display region 51e is a region where a temperature state of working oil in a working oil tank is displayed as an image, and the alarm display region 51f is a region where a variety of information such as an alarm message is displayed.

The notification unit 42 determines display details of the high voltage part temperature display region 51a displayed on the display screen 51V according to detection signals of the temperature sensors S1 to S6. The high voltage part temperature display region 51a is configured by a bar graph including five segments, as shown in FIG. 10A.

For example, in a case where the capacitor temperature is lower than a low temperature side limiting start temperature tc6 (see FIG. 10B), the notification unit 42 lights a left-end segment among five segments for display (see a first column 55a in FIG. 10C). The low temperature side limiting start temperature tc6 is a threshold value for determining whether swivel output limiting due to insufficient warming up of the capacitor 19 is necessary. Here, the capacitor 19 is in an insufficiently warmed up state, and the swivel output control unit 41 controls the movement of the swiveling motor 21 using a final swivel output limiting value which is smaller than the maximum value Pmax.

Specifically, if the capacitor temperature is lower than the low temperature side limiting start temperature tc6, the swivel output control unit 41 more gradually decreases a value derived as the sixth swivel output limiting value from the maximum value Pmax as the capacitor temperature becomes lower. Thus, it is possible to prevent the swiveling motor 21 from being operated at a maximum output in a state where the capacitor 19 is not sufficiently warmed up. Further, the notification unit 42 displays a message "capacitor is being warmed up (idling)/output is being limited (device is being operated)" in the alarm display region 51f on the display screen 51V of the liquid crystal display 51, without outputting an alarm through the speaker. With respect to the motor generator temperature, the first inverter temperature, the swiveling motor temperature, the second inverter temperature, and the step-up/down converter temperature, the low pressure-side limiting start temperature is not set. This is because the motor generator 12, the inverter 18, the swiveling motor 21, the inverter 20, and the step-up/down converter 100 are appropriately operated even in a case where the temperature is low and are favorably operated when the temperature is rather lowered.

Further, in a case where the capacitor temperature is equal to or higher than the low temperature side limiting start value tc6 and temperatures of all swiveling associated components which are high voltage parts are lower than a predetermined 3-segment lighting temperature, the notification unit 42 lights two left-side segments among five segments for display (see a second column 55b in FIG. 10C). The 3-segment lighting temperature is a threshold value for determining whether the three left-side segments among five segments in the high voltage part temperature display region 51a are to be lighted for display, and for example, includes a 3-segment lighting temperature tm6 (see FIG. 10B) relating to the capacitor temperature. In a case where the temperatures of all the swiveling associated components are lower than the 3-segment lighting temperature, all the swiveling associated components are in an appropriate temperature state, and the swivel output control unit 41 controls the movement of the swiveling motor 21 using a final swivel output limiting value which is the maximum value Pmax, that is, without limiting the swivel output. Further, the notification unit 42 does not output an alarm through the speaker, and does not display a message in the alarm display region 51f.

Further, in a case where a temperature of any one of the swiveling associated components which are high voltage parts is equal to or higher than the 3-segment lighting temperature and is lower than a 4-segment lighting temperature, the notification unit 42 lights three left-side segments among five segments for display (see a third column 55c in FIG. 10C). The 4-segment lighting temperature is a threshold value for determining whether the four left-side segments among five segments in the high voltage part temperature display region 51a are to be lighted for display, and for example, includes a 4-segment lighting temperature th6 (see FIG. 10B) relating to the capacitor temperature. For example, in a case where the capacitor temperature is equal to or higher than the 3-segment lighting temperature tm6 and is lower than the 4-segment lighting temperature th6, three left-side segments are lighted for display. In this case, all the swiveling associated components are in an appropriate temperature state, and the swivel output control unit 41 controls the movement of the swiveling motor 21 using the final swivel output limiting value which is the maximum value Pmax, that is, without limiting the swivel output. Further, the notification unit 42 does not output an alarm through the speaker, and does not display a message in the alarm display region 51f.

Further, in a case where a temperature of any one of the swiveling associated components which are high voltage parts is equal to or higher than the 4-segment lighting temperature and is lower than a predetermined output limiting notification temperature, the notification unit 42 lights four left-side segments among five segments for display (see a fourth column 55d in FIG. 10C). The output limiting notification temperature is a threshold value for determining whether swivel output limiting should be performed, and for example, includes an output limiting notification temperature tw6 relating to the capacitor temperature (see FIG. 10B). For example, in a case where the capacitor temperature is equal to or higher than the 4-segment lighting temperature th6 and is lower than the output limiting notification temperature tw6, four left-side segments are lighted for display. In this case, all the swiveling associated components are in an appropriate temperature state, and the swivel output control unit 41 controls the movement of the swiveling motor 21 using the final swivel output limiting value which is the maximum value Pmax, that is, without limiting the swivel output. Further, the notification unit 42 does not output an alarm through the speaker, and does not display a message in the alarm display region 51f.

Further, in a case where a temperature of any one of the swiveling associated components which are high voltage parts is equal to or higher than an output limiting notification temperature and is lower than a predetermined high temperature side limiting start temperature, the notification unit 42 notifies an operator of a message indicating that there is a concern that swivel output limiting is to be performed in a state where four left-side segments among five segments are lighted for display. For example, in a case where the capacitor temperature is equal to or higher than the output limiting notification temperature tw6 and is lower than the high temperature side limiting start temperature tr6 (see FIG. 10B), in a state where the four left-side segments are lighted for display, the notification unit 42 outputs an alarm through the speaker, and displays a message "output limiting notification" in the alarm display region 51f. Thus, it is possible to notify the operator that there is a concern that the swivel output limiting is to be performed in a case where the temperature of the capacitor 19 further increases. In this case, all the swiveling associated components are still in an appropriate temperature state, but the capacitor 19 leans to being overheated, that is, may enter an overheated state in a case where the temperature further increases. The swivel output control unit 41 controls the movement of the swiveling motor 21 using the final swivel output limiting value which is still at the maximum value Pmax, that is, without limiting the swivel output.

Further, in a case where a temperature of any one of the swiveling associated components which are high voltage parts is equal to or higher than a predetermined high temperature side limiting start temperature and is lower than a predetermined stop temperature, the notification unit 42 lights all five segments for display (see a fifth column 55e in FIG. 10C). For example, in a case where the capacitor temperature is equal to or higher than the high temperature side limiting start temperature tr6 and is lower than the stop temperature ts6 (see FIG. 10B), the notification unit 42 lights all the five segments for display. In this case, the capacitor 19 is in an overheating state, and the swivel output control unit 41 controls the movement of the swiveling motor 21 using the final swivel output limiting value which is smaller than the maximum value Pmax. Further, the notification unit 42 outputs an alarm through the speaker, and displays a message "output is being limited" to the alarm display region 51f.

Further, in a case where a temperature of any one of the swiveling associated components which are high voltage parts is equal to or higher than the predetermined stop temperature, the notification unit 42 notifies an operator of a message indicating that there is a concern that the swiveling associated component is broken in a state where all the five segments are lighted for display (see a sixth column 55f in FIG. 10C). For example, in a case where the capacitor temperature is equal to or higher than the predetermined stop temperature ts6, in a state where all the five segments are lighted for display, the notification unit 42 outputs an alarm through the speaker, and displays a message "hybrid system overheated" to the alarm display region 51f. In this case, the capacitor 19 is in an overheated state, and the swivel output control unit 41 stops the movement of the swiveling motor 21 using the final swivel output limiting value which is the minimum value Pmin.

Through the above-described configuration, in a case where the temperature of the swiveling associated component reaches a predetermined high temperature side limiting start temperature, the controller 30 limits the output of the swiveling motor 21 driven by at least one of electric power generated by the motor generator 12 and electric power accumulated in the capacitor 19. As a result, the controller 30 appropriately can stop overheating of the swiveling associated component relating to the swiveling motor 21 that uses the electric power from the motor generator 12 and the electric power from the power storage system 120.

Further, the controller 30 derives the first to sixth swivel output limiting values from the detection values of the temperature sensors S1 to S6 with reference to the correspondence maps indicating the relationships between the temperatures and the swivel output limiting values of the swiveling associated components. Further, the controller 30 derives a minimum value (most stringent value) among the six swivel output limiting values as a final swivel output limiting value, and controls the output of the swiveling motor 21 using the final swivel output limiting value. As a result, in a case where a temperature of any one of the swiveling associated components reaches a predetermined high temperature side limiting start temperature, the controller 30 may limit the output of the swiveling motor 21 to appropriately prevent overheating of the swiveling associated component. For example, in a case where a radiator causes clogging, and as a result, its cooling ability deteriorates, the capacitor temperature increases to reach the high temperature side limiting start temperature tr6, the controller 30 may limit the output of the swiveling motor 21 to appropriately prevent overheating of the capacitor 19.

Further, in a case where a temperature of any one of the swiveling associated components reaches a predetermined output limiting notification temperature, the controller 30 notifies an operator of a message indicating that swivel output limiting should be performed without limiting the output of the swiveling motor 21. As a result, in a stage before the output of the swiveling motor 21 is limited, the controller 30 may notify the operator of the message indicating that the swivel output limiting should be performed.

Further, in a case where a temperature of any one of the swiveling associated components reaches a predetermined high temperature side limiting start temperature, the controller 30 notifies an operator of a message indicating that the swivel output is being limited in a state where the output of the swiveling motor 21 is limited. As a result, the controller 30 may reliably notify the operator of a message indicating that the swivel output limiting is to be performed due to increase in the temperature of the swiveling associated component.

Hereinbefore, the preferred embodiments of the invention have been described, but the invention is not limited to the above-described embodiments, and various modifications and replacements with respect to the above-described embodiments may be made in a range without departing from the scope of the invention.

For example, in the above-described embodiments, each correspondence map shows a tendency that the swivel output limiting value linearly decreases at a specific lowering rate when a temperature of a swiveling associated component increases to a stop temperature from a high temperature side limiting start temperature. However, the invention is not limited to this configuration. For example, the correspondence map may show a tendency that the swivel output limiting value decreases in stages and linearly at plural steps of lowering rates when the temperature of the swiveling associated component increases to the stop temperature from the high temperature side limiting start temperature.

Alternatively, the correspondence map may show a tendency that the swivel output limiting value non-linearly decreases when the temperature of the swiveling associated component increases to the stop temperature from the high temperature side limiting start temperature, or may show a tendency that the swivel output limiting value decreases in stages at plural steps.

Figure 11:
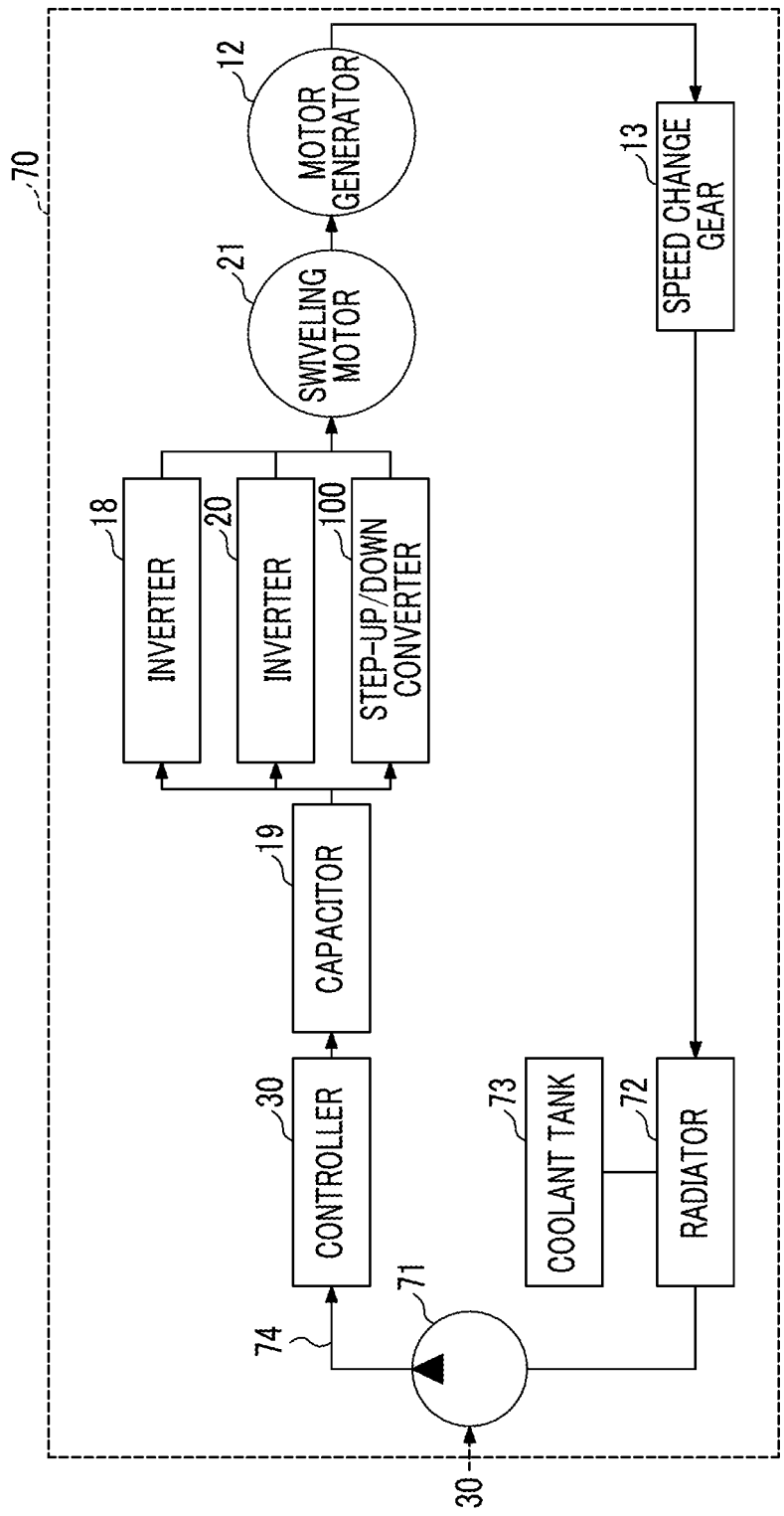

FIG. 11 is a diagram illustrating a configuration example of the cooling system 70. The cooling system 70 mainly includes a coolant pump 71, a radiator 72, a coolant tank 73, and a cooling tube 74.

The coolant pump 71 suctions and discharges a coolant accumulated in the coolant tank 73, and circulates the coolant in a cooling circuit formed by the cooling tube 74. In this embodiment, the coolant pump 71 discharges the coolant cooled by the radiator 72. Then, the coolant flows through the inside of the cooling tube 74 disposed to be adjacent to the respective devices of the controller 30, the capacitor 19, the inverter 18, the inverter 20, the step-up/down converter 100, the swiveling motor 21, the motor generator 12, and the speed change gear 13 to cool the respective devices, and then returns to the radiator 72. In this embodiment, the coolant is a liquid mixture of water and a long line coolant (LLC).

Further, in this embodiment, the cooling tube 74 is divided into three routes in respective portions thereof adjacent to the inverter 18, the inverter 20, and the step-up/down converter 100, so that the three routes are arranged in parallel, and are arranged in series in other portions thereof. Here, the cooling tube 74 may be arranged using an arbitrary connection method including parallel connection and serial connection.

In this embodiment, a configuration in which one cooling circuit is used is employed, but a configuration in which plural cooling circuits are used may be employed. In this case, a configuration in which one coolant pump is used with respect to each cooling circuit may be employed, or a configuration in which one coolant pump may be used with respect to plural cooling circuits may be employed. Further, a switching valve that switches a flowing direction of a coolant that is discharged by the coolant pump may be used, or a flow rate control value that adjusts a flow rate of a coolant may be used.

Further, in this embodiment, the operation and stop of the coolant pump 71 is controlled according to control signals (operation signal and stop signal) from the controller 30 (control mode switching unit 30F). In addition, in this embodiment, the coolant pump 71 is a fixed capacity type pump that rotates at a predetermined rotational speed, but the rotational speed (the amount of discharge per unit time) may be changed according to a control signal (speed signal) from the controller 30. Furthermore, the coolant pump 71 may be a variable capacity type pump. The control mode of the coolant pump 71 that starts according to the operation signal corresponds to a coolant pump operating mode, and the control mode of the coolant pump 71 that starts according to the stop signal corresponds to a coolant pump stop mode.

Figure 12:
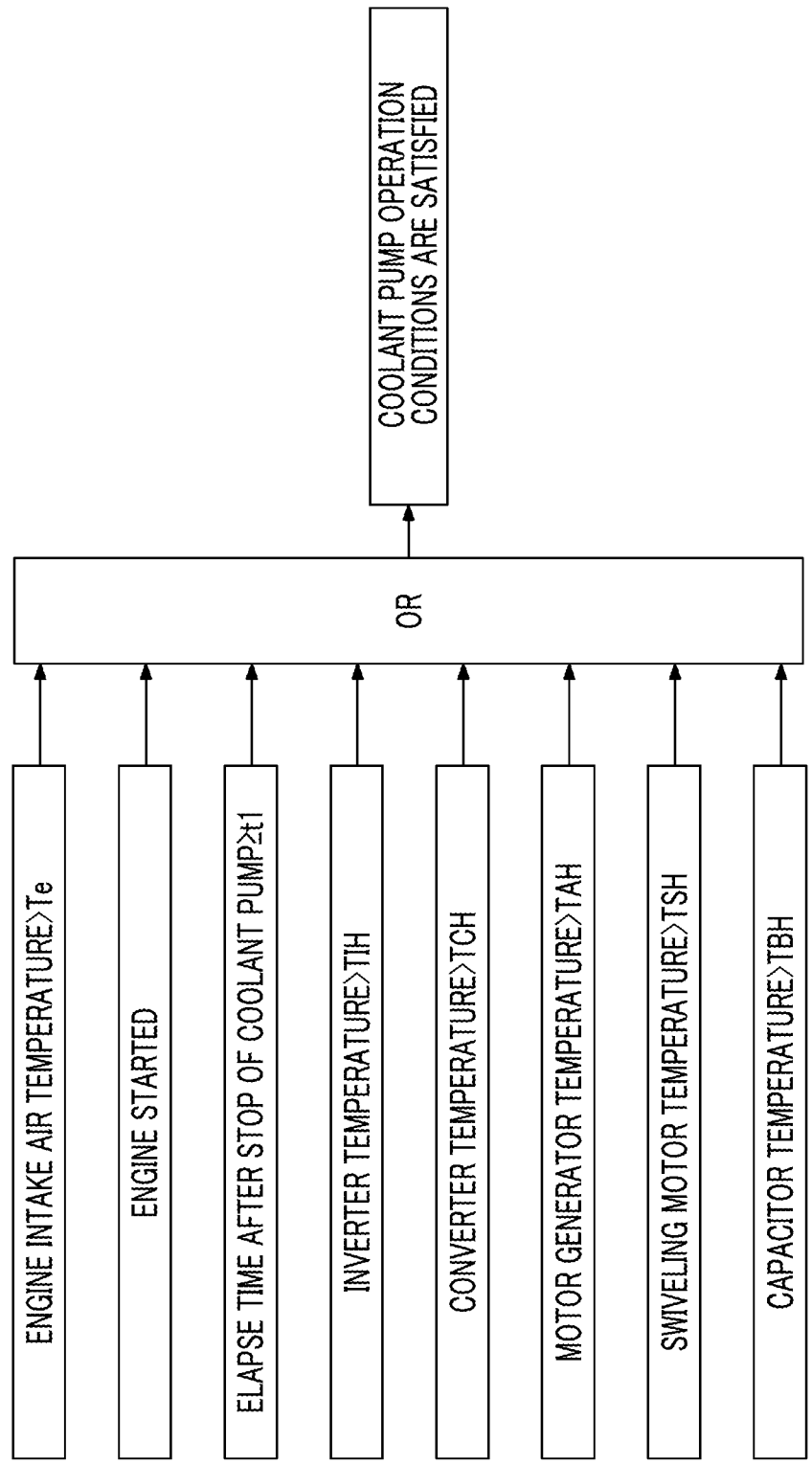

Then, operation conditions of the coolant pump 71 will be described with reference to FIG. 12. In a case where an engine intake air temperature is higher than a predetermined temperature Te, in a case where the engine 11 is started up, in a case where an elapsed time after the coolant pump is stopped reaches a predetermined time t1, in a case where any one of inverter temperatures including a first inverter temperature and a second inverter temperature is higher than a predetermined temperature TIH, in a case where a converter temperature is higher than a predetermined temperature TCH, in a case where the motor generator temperature is higher than a predetermined temperature TAH, in a case where a swiveling motor temperature is higher than a predetermined temperature TSH, or in a case where a capacitor temperature is higher than a predetermined temperature TBH, the controller 30 operates the coolant pump 71.

Specifically, when an engine intake air temperature detected by the engine sensor 29A is higher than a predetermined temperature Te, the controller 30 operates the coolant pump 71. This is because it can be determined that it is not necessary to warm up the capacitor 19 and to stop the operation of the coolant pump 71 since an outside air temperature is high. The warming up of the capacitor 19 is a process executed by the controller 30 in a case where the capacitor temperature is lower than a predetermined temperature, in which the controller 30 increases the temperature of the capacitor 19 by self-heating due to internal resistance of the capacitor 19 according to charging or discharging of the capacitor 19. Thus, it is possible to prevent deterioration or breakdown of the capacitor 19 based on deviation of a capacitor voltage from an allowable voltage range in charging or discharging of the capacitor 19 due to high internal resistance in a case where the capacitor temperature is low. Further, in a case where the warming up of the capacitor 19 is performed, the controller 30 stops the operation of the coolant pump 71 in order to prompt the warming up of the capacitor 19 as long as other stop conditions (which will be described later) of the coolant pump 71 are satisfied. The controller 30 may determine whether the coolant pump 71 is to be operated based on a temperature of the outside air instead of the temperature of the engine intake air.

Further, the controller 30 determines whether starting of the engine 11 is performed based on the engine speed detected by the engine sensor 29A. In a case where it is determined that the starting of the engine 11 is performed, the controller 30 starts the coolant pump 71 stopped while the engine is being stopped. Thus, it is possible to early remove a state where a temperature of a cooling target excessively increases since a stop continuation time of the coolant pump 71 gets excessively longer due to a temporary stop of the engine 11. The controller 30 may determine whether the starting of the engine 11 is performed based on an output of an ignition switch or the like, or may determine whether the starting of the engine 11 is performed by a rotational speed of the motor generator 12. Further, in a case where it can be determined that the stop time of the engine 11 is equal to or longer than a predetermined period of time, the controller 30 may not perform the operation of the coolant pump 71 when the engine 11 starts. This is because it can be determined that the temperature of the cooling target is sufficiently lowered.

Further, the controller 30 monitors a time elapsed after the coolant pump is stopped, which is a time elapsed after a stop signal is output to the coolant pump 71, and in a case where the elapsed time after the coolant pump is stopped reaches the predetermined time t1, the controller 30 operates the coolant pump 71. Thus, it is possible to prevent the temperature of the cooling target from being excessively increased since the stop continuation time of the coolant pump 71 gets excessively longer.

In addition, in a case where the first inverter temperature detected by the temperature sensor S2 is higher than a predetermined temperature TIH, or in a case where the second inverter temperature detected by the temperature sensor S4 is higher than the predetermined temperature TIH, the controller 30 operates the coolant pump 71. Thus, it is possible to prevent overheating of the inverter 18 and the inverter 20. Further, the controller 30 operates the coolant pump 71 in a case where the converter temperature detected by the temperature sensor S5 is higher than the predetermined temperature TCH. Thus, it is possible to prevent overheating of the step-up/down converter 100. Further, in a case where the motor generator temperature detected by the temperature sensor S1 is higher than a predetermined temperature TAH, the controller 30 operates the coolant pump 71. Thus, it is possible to prevent overheating of the motor generator 12. In a case where the swiveling motor temperature detected by the temperature sensor S3 is higher than a predetermined temperature TSH, the controller 30 operates the coolant pump 71. Thus, it is possible to prevent overheating of the swiveling motor 21. Further, in a case where the capacitor temperature detected by the temperature sensor S6 is higher than a predetermined temperature TBH, the controller 30 operates the coolant pump 71. Thus, it is possible to prevent overheating of the capacitor 19.

Figure 13:
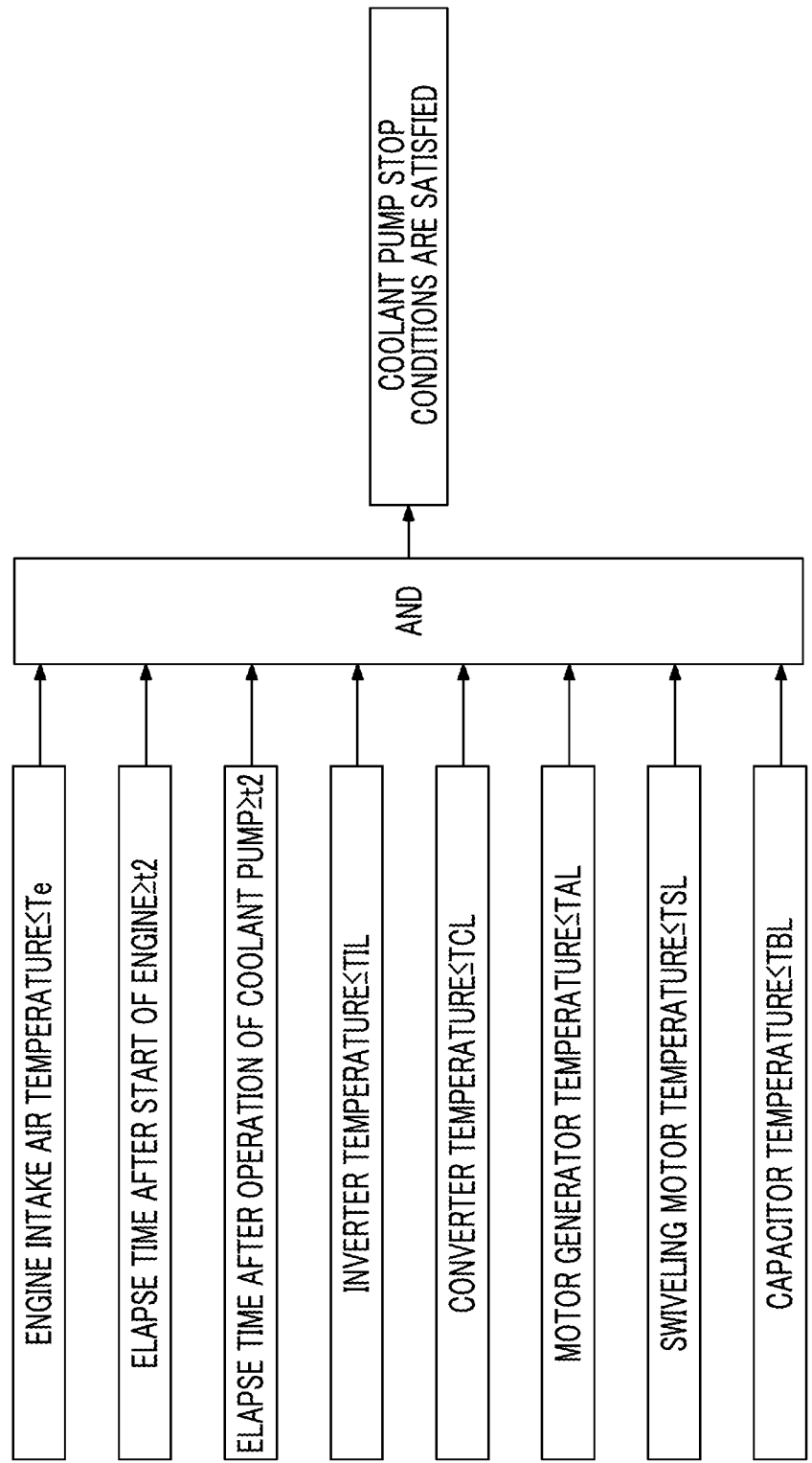

Then, stop conditions of the coolant pump 71 will be described with reference to FIG. 13. In a case where all conditions, that is, a condition that the engine intake air temperature is equal to or lower than the predetermined temperature Te, a condition that the time elapsed after the engine is started is equal to or longer than the predetermined time t2, a condition that the time elapsed after the coolant pump is operated is equal to or longer than the predetermined time t2, a condition that the inverter temperature is equal to or lower than a predetermined temperature TIL, a condition that the converter temperature is equal to or lower than a predetermined temperature TCL, a condition that the motor generator temperature is equal to or lower than a predetermined temperature TAL, and a condition that the swiveling motor temperature is equal to or lower than a predetermined temperature TSL, and a condition that the capacitor temperature is equal to or lower than a predetermined temperature TBL are satisfied, the controller 30 stops the coolant pump 71.

The condition that the engine intake air temperature is equal to or lower than the predetermined value Te is based on the assumption that it can be determined that it is necessary to warm up the capacitor 19 in a case where an outside air temperature is low and it is effective to stop the coolant pump 71 in order to warm up the capacitor 19.

Further, the condition that the time elapsed after the engine is started is equal to or longer than the predetermined time t2 is set for appropriately realizing an effect based on an intermittent operation (which will be described later) of the coolant pump 71. Specifically, since if the engine 11 is started, the coolant pump 71 is operated, the fact that the time elapsed after the engine is started reaches the predetermined time t2 means that the coolant pump 71 is operated over the predetermined time t2. Further, the predetermined time t2 is set as a sufficient time for realization of the effect based on the intermittent operation (which will be described later) of the coolant pump 71. This is similarly applied to the condition that the time elapsed after the coolant pump is operated is equal to or longer than the predetermined time t2.

The condition that the inverter temperature is equal to or lower than the predetermined temperature TIL, the condition that the converter temperature is equal to or lower than the predetermined temperature TCL, the condition that the motor generator temperature is equal to or lower than the predetermined temperature TAL, the condition that the swiveling motor temperature is equal to or lower than the predetermined temperature TSL, and the condition that the capacitor temperature is equal to or lower than a predetermined temperature TBL are set for preventing a wasteful operation of the coolant pump 71 while preventing overheating of the respective devices which are cooling targets of the cooling system 70.

Figure 14:
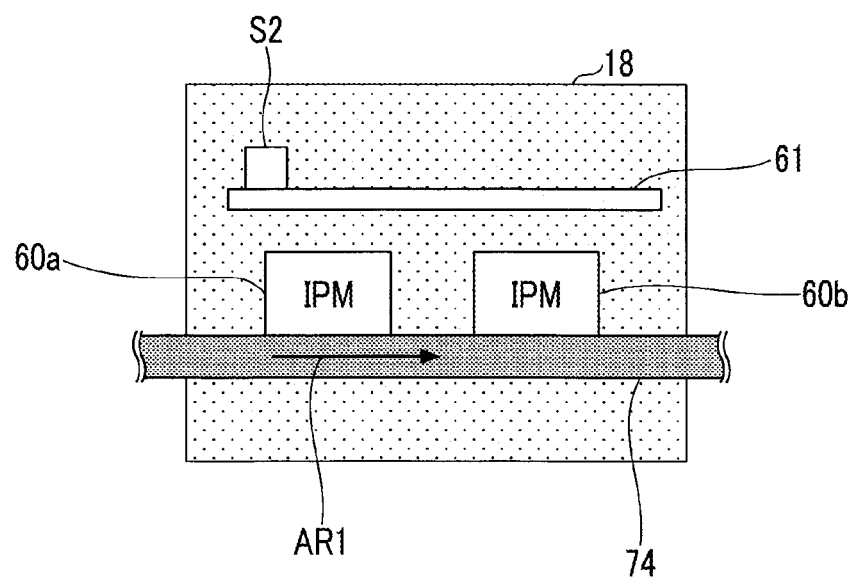

Then, a method for measuring the temperature of the inverter 18 will be described with reference to FIG. 14. FIG. 14 is a schematic diagram illustrating the inside of the inverter 18 which is one of cooling targets of the cooling system 70. Further, a region indicated by coarse hatching in FIG. 14 represents the inside of a housing of the inverter 18, and a region indicated by fine hatching represents the inside of the cooling tube 74 that forms the cooling system 70. Further, an arrow AR1 in FIG. 14 indicates a flow of a coolant in the cooling tube 74. The method for measuring the temperature of the inverter 18 is also applied to measurement of the temperature of each of the inverter 20 and the step-up/down converter 100.

As shown in FIG. 14, the inverter 18 includes IPMs 60a and 60b which are plural (two in FIG. 14) intelligent power modules which are heat sources, and a substrate 61. Further, the temperature sensor S2 for detecting an ambient temperature inside the housing of the inverter 18 is provided on the substrate 61. Further, the cooling tube 74 is provided to be in contact with the IPMs 60a and 60b, and the temperature sensor S2 is provided to be in non-contact with the IPMs 60a and 60b.

Thus, heat of the IPMs 60a and 60b is transferred to the cooling tube 74 by thermal conduction, and if a coolant flows in the cooling tube 74, the heat transferred to the cooling tube 74 is discharged outside along the coolant. As a result, the temperatures of the IPMs 60a and 60b and the cooling tube 74 are relatively rapidly lowered. Further, if the temperature of the cooling tube 74 becomes lower than the temperature of air inside the housing of the inverter 18, the air inside the housing is cooled, and heat of the substrate 61 and the temperature sensor S2 is transferred to the cooling tube 74 by convection of the cooled air. Thus, the ambient temperature detected by the temperature sensor S2 changes with delays with respect to changes in the temperatures of the IPMs 60a and 60b, and the cooling tube 74, and is relatively smoothly lowered. In this way, if the coolant flows in the cooling tube 74, the IPMs 60a and 60b are in a state of temperatures lower than the ambient temperature detected by the temperature sensor S2.

On the other hand, if the flow of the coolant in the cooling tube 74 is stopped, the heat transferred to the cooling tube 74 is not discharged outside. As a result, the temperatures of the IPMs 60a and 60b, and the cooling tube 74 relatively rapidly increase. Further, if the temperature of the cooling tube 74 becomes higher than the temperature of the air inside the housing of the inverter 18, the air in the housing is heated, and the heat of the IPMs 60a and 60b, and the cooling tube 74 is transferred to the temperature sensor S2 by convection of the heated air. Thus, the ambient temperature detected by the temperature sensor S2 changes with delays with respect to changes in the temperatures of the IPMs 60a and 60b, and the cooling tube 74, and relatively smoothly increases. In this way, if the flow of the coolant in the cooling tube 74 is stopped, the temperatures of the IPMs 60a and 60b are in a state of temperatures higher than the ambient temperature detected by the temperature sensor S2.

From the above-described phenomenon, it can be understood that by appropriately setting a period of time when the flow of the coolant is generated and a period of time when the flow of the coolant is stopped, it is possible to control a gap between a temperature of a heat source and an ambient temperature. Further, if it is possible to control the gap between the temperature of the heat source and the ambient temperature, it is possible to estimate a temperature of each of plural heat sources without directly estimating the temperature of each of the plural heat sources.

Thus, the controller 30 controls the gap between the temperature of the heat source and the ambient temperature by repeating the operation and stop of the coolant pump 71. Hereinafter, the repetition of the operation and stop of the coolant pump 71 is referred to as an intermittent operation of the coolant pump 71.

Figure 15:
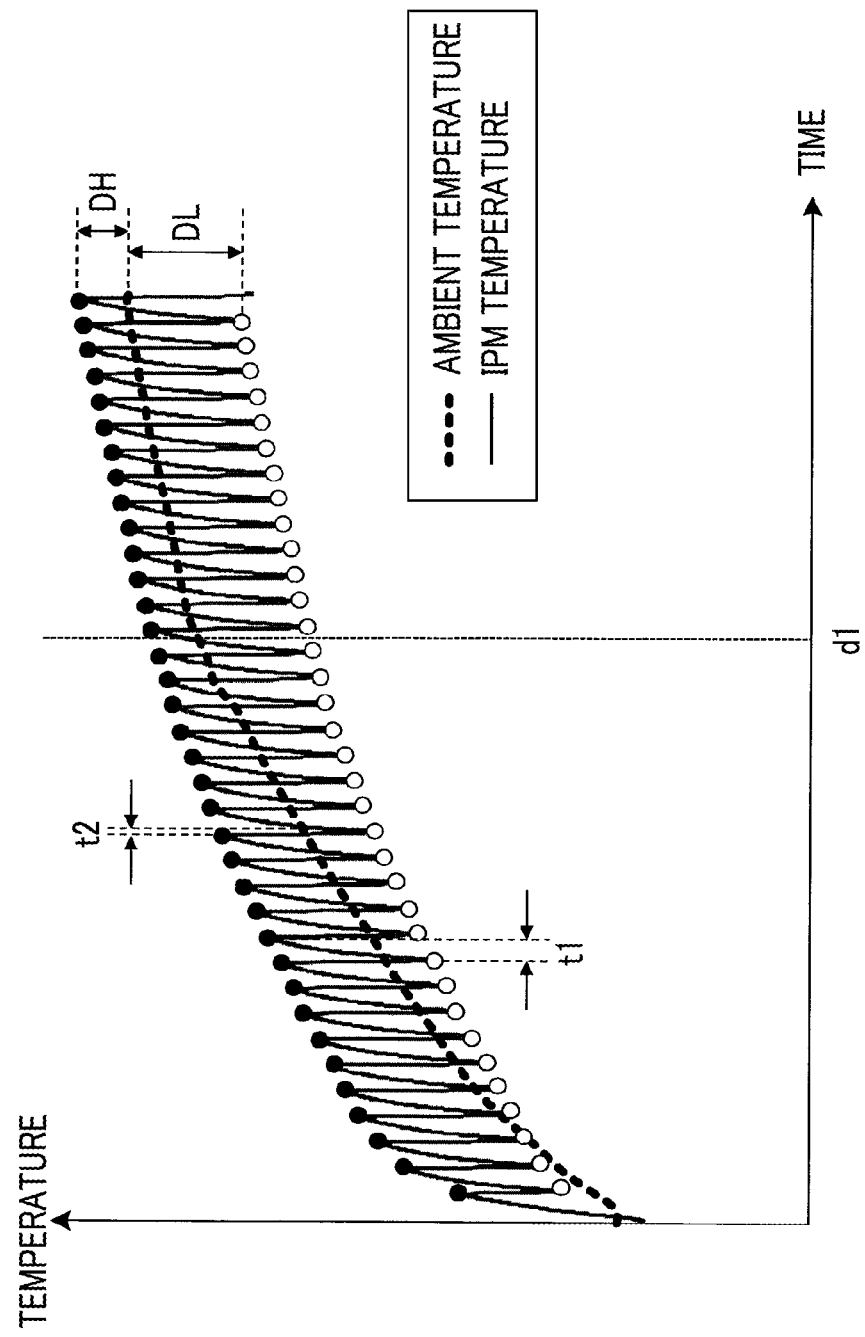

An example of an effect based on the intermittent operation of the coolant pump 71 will be described with reference to FIG. 15. FIG. 15 is a diagram illustrating temporal changes in an ambient temperature inside the housing of the inverter 18 and a temperature (IPM temperature) of the IPM 60a which is a heat source. In FIG. 15, a solid change line represents temporal change in the IPM temperature, and a dotted change line represents temporal change in the ambient temperature. Further, black circles in the figure represent IPM temperatures when the operation of the coolant pump 71 is started, and white circles in the figure represent IPM temperatures when the operation of the coolant pump 71 is stopped. In this embodiment, an operator continuously operates the inverter 18 so that a condition which is thermally most stringent is set for the IPM 60a. Thus, in a case where the operator intermittently operates the inverter 18 as if the shovel is actually used, assuming that the details of the intermittent operation of the coolant pump 71 is uniformly maintained, an increasing inclination of the IPM temperature becomes smaller than that shown in the figure. Further, the high temperature side gap of the IPM temperature with respect to the ambient temperature becomes smaller. This means that if it is possible to detect high temperature abnormality of the IMP temperature from the ambient temperature under the most stringent condition, there is no concern that the high temperature abnormality of the IPM temperature cannot be detected under other conditions.

As shown in FIG. 15, the controller 30 alternately repeats the stop of the coolant pump 71 over a predetermined stop continuation time t1 (corresponding to the above-described predetermined time t1) and the operation of the coolant pump 71 over a predetermined operation continuation time t2 (corresponding to the above-described predetermined time t2). In this embodiment, the stop continuation time t1 is longer than the operation continuation time t2.

Specifically, the controller 30 outputs an operation signal to the coolant pump 71 to start the operation of the coolant pump 71. Further, at a time point when the operation continuation time t2 elapses after the coolant pump 71 is operated, the controller 30 outputs a stop signal to the coolant pump 71 to stop the operation of the coolant pump 71. In addition, at a time point when the operation continuation time t1 elapses after the coolant pump 71 is stopped, the controller 30 outputs an operation signal to the coolant pump 71 to start the operation of the coolant pump 71 again. Then, the controller 30 repeats the operation and stop of the coolant pump 71 under the same conditions.

As a result, the IPM temperature shows an increasing inclination over a long period of time while repeating relatively rapid increase according to the stop of the coolant pump 71 and relatively rapid decrease according to the operation of the coolant pump 71. As described above, since the temporal change in FIG. 15 is obtained in a case where the inverter 18 is continuously operated, this is different from temporal change in a case where the inverter 18 is intermittently operated. Specifically, in a case where the inverter 18 is intermittently operated, as the period of time when the inverter 18 is stopped becomes longer, the increasing inclination of the IPM temperature is suppressed, and further, is reversely changed to a decreasing inclination.

On the other hand, in a case where the operation and stop of the coolant pump 71 are repeated at the above-described timings, the ambient temperature increase along the increasing inclination of the IPM temperature over the long period of time. Further, when exceeding a time point d1, the degree of the high temperature side gap (a difference DH between the IPM temperature and the embodiment temperature when the coolant pump 71 is operated) of the IPM temperature with respect to the ambient temperature, and the degree of the low temperature side gap (a difference DL between the IPM temperature and the ambient temperature when the operation of the coolant pump 71 is stopped) of the IPM temperature with respect to the ambient temperature become approximately uniform. This means that the increasing inclination of the IPM temperature and the increasing inclination of the ambient temperature match each other over a long period of time by appropriately setting the operation continuation time and the stop continuation time of the coolant pump 71.

From this relationship, the controller 30 can determine that the IPM temperature reaches an allowable maximum temperature in a case where the ambient temperature reaches a predetermined upper limit temperature, and can execute an appropriate process for preventing overheating of the inverter 18. That is, the controller 30 can execute temperature management of the inverter 18 based on the ambient temperature.

For example, in a case where a detection value of the temperature sensor S2 reaches a predetermined upper limit value, the controller 30 continuously operates the coolant pump 71. Further, the controller 30 may limit the movement of the shovel, for example, may limit the movement of the swiveling motor 21, or may increase the amount of discharge per unit time of the coolant pump 71.

In the above-described embodiments, the controller 30 restarts the operation of the coolant pump 71 at a time point when the stop continuation time t1 elapses, but restarts the operation of the coolant pump 71 in a case where the above-described other operation conditions are satisfied even before the stop continuation time t1 elapses. Here, this control has an effect of suppressing the increasing inclination of the IPM temperature, and thus, does not badly affect the temperature management of the inverter 18 based on the ambient temperature.

With such a configuration, the controller 30 controls a cooling system that circulates a coolant in a cooling circuit to cool plural cooling targets including at least one electrical device and a power storage. Further, in a case where any one of temperatures of the plural cooling targets reaches a predetermined corresponding threshold value, the controller 30 starts an operation of the coolant pump 71 to start circulation of the coolant. Thus, the controller 30 can stop the operation of the coolant pump 71 until a predetermined operation condition is satisfied. As a result, the controller 30 can stop the coolant pump 71 until it is determined that the operation of the coolant pump 71 is necessary, and thus, can more efficiently control the cooling system. Further, when warming up the power storage, the controller 30 can prompt the warming up of the power storage by stopping the coolant pump 71.

Further, in a case where each temperature of the plural cooling targets is lower than a predetermined corresponding threshold value, the controller 30 stops the operation of the coolant pump 71 and stops the circulation of the coolant. Thus, in a case where a predetermined stop condition is satisfied, the controller 30 can stop the operation of the coolant pump 71. As a result, the controller 30 can more efficiently control the cooling system without wastefully continuing the operation of the coolant pump 71.

Further, the controller 30 repeats a circulation stop of the coolant according to the stop of the cooling system 70 over the predetermined stop continuation time t1 and circulation of the coolant according to the operation of the cooling system 70 over the operation continuation time t2 (<t1). Specifically, the controller 30 executes an intermittent operation of the coolant pump 71 which corresponds to the repetition of the stop of the coolant pump 71 over the stop continuation time t1 and the operation of the coolant pump 71 over the operation continuation time t2. Thus, it is possible to execute temperature management of an electrical device such as the inverter 18 including plural heat sources such as the IPMs 60a and 60b, based on an ambient temperature inside a housing of the electrical device, instead of temperatures of the plural heat sources. Specifically, the controller 30 can execute temperature management based on a detection value of one temperature sensor disposed in the housing without attaching temperature sensors to the plural heat sources. Thus, it is possible to reduce the number of temperature sensors necessary for temperature management of the electrical device.

Further, the controller 30 may limit or stop a movement of the electrical device in a case where an ambient temperature reaches a predetermined temperature. Specifically, in a case where the ambient temperature inside the housing of the inverter 18 reaches a predetermined temperature, the controller 30 may limit or stop the movement of the inverter 18 by limiting or stopping the movement of the swiveling motor 21. As a result, the controller 30 can prevent overheating of the inverter 18.

Further, the controller 30 circulates a coolant by operating the coolant pump 71 over a predetermined period of time when starting an engine, regardless of each temperature of the plural cooling targets. Thus, it is possible to early remove a state where the temperature of each cooling target excessively increases since the stop continuation time of the coolant pump 71 becomes excessively long due to a temporary stop of the engine 11. Further, even in a case where the engine 11 is temporarily stopped, it is possible to perform temperature management of the electrical device such as the inverter 18 based on the ambient temperature inside the housing thereof, instead of each temperature of the plural heat sources such as an IPM. Specifically, even in a case where the engine 11 is temporarily stopped, by operating the coolant pump 71 in a case where an elapsed time after the coolant pump is stopped reaches a predetermined time t1, it is possible to prevent a difference between an ambient temperature detected by a temperature sensor and a temperature of a heat source which is not detected by a temperature sensor from being excessively increased. As a result, it is possible to maintain effectiveness of an intermittent operation of the coolant pump 71.

Further, in a case where a predetermined time elapses after the circulation of the coolant is stopped by stopping the operation of the coolant pump 71, the controller 30 starts the circulation of the coolant by restarting the operation of the coolant pump 71. Thus, it is possible to prevent a temperature of a cooling target from being excessively increased since the stop continuation time of the coolant pump 71 becomes excessively long. Further, even in a case where the coolant pump 71 is stopped, it is possible to perform temperature management of an electrical device such as the inverter 18 based on an ambient temperature inside a housing thereof, instead of each temperature of the plural heat sources such as the IPM. Specifically, even in a case where the coolant pump 71 is stopped, by operating the coolant pump 71 in a case where an elapsed time after the coolant pump is stopped reaches a predetermined time t1, it is possible to prevent a difference between an ambient temperature detected by a temperature sensor and a temperature of a heat source which is not detected by a temperature sensor from being excessively increased. As a result, similar to the above description, it is possible to maintain effectiveness of an intermittent operation of the coolant pump 71. Further, even when the coolant pump 71 is temporarily stopped when the capacitor 19 is warmed up, the effect of the intermittent operation of the coolant pump 71 is not affected.

Further, in a case where a predetermined time elapses after the operation of the coolant pump 71 is started to start circulation of a coolant, the controller 30 stops the operation of the coolant pump 71 to stop the circulation of the coolant. Thus, it is possible to efficiently control the cooling system without wastefully continuing the operation of the coolant pump 71 while maintaining effectiveness of the intermittent operation of the coolant pump 71.

Hereinbefore, preferred embodiments of the invention have been described, but the invention is not limited to the above-described embodiments, and various modifications and replacements may be made without departing from the scope of the invention.

For example, in the above-described cooling circuit, the capacitor 19 is disposed on a downstream side of the controller 30 before the cooling tube 74 is divided into three routes, but may be disposed on an upstream side of the controller 30, or may be disposed in a portion after the divided routes are merged on an upstream side of the swiveling motor 21. Basically, electrical devices such as the inverter 18, the capacitor 19 and the inverter 20 may be cooled before cooling of motor devices such as the motor generator 12 and the swiveling motor 21. Thus, as long as the cooling is performed in the order of the electrical devices and the motor devices, the cooling order of the electrical devices is arbitrary, and the cooling order of the motor devices is also arbitrary. Here, the invention does not exclude a configuration in which the electrical devices are cooled after the motor devices are cooled. Accordingly, the capacitor 19 may be disposed on a downstream side of the swiveling motor 21, the motor generator 12, or the speed change gear 13. Cooling of at least one of the controller 30 and the speed change gear 13 may not be performed.

Further, in the above-described embodiments, the capacitor temperature is detected by the temperature sensor S6 configured by a thermistor attached to an electrode of a capacitor cell, but the invention is not limited to the configuration. For example, the capacitor temperature may be intermittently detected by detecting temperature of cooling water used for cooling of the capacitor 19.

It should be understood that the invention is not limited to the above-described embodiment, but may be modified into various forms on the basis of the spirit of the invention. Additionally, the modifications are included in the scope of the invention.

What is claimed is:

1. A shovel comprising:
   a traveling body;
   a swivel body that is rotatably mounted on the traveling body;
   an attachment that is configured by a boom, an arm, and an end attachment;
   a motor generator;
   a first inverter that controls the motor generator;
   a power storage system that is mounted on the swivel body;
   a swiveling motor that is driven by electric power from the motor generator and the power storage system, wherein the swivel body is driven by only the swiveling motor;
   a second inverter that controls the swiveling motor;
   a temperature detection unit that acquires respective temperatures of the motor generator, the first inverter, the second inverter, the power storage system, and the swiveling motor; and
   a control device including a swivel output control unit, wherein the control device controls an output of the swiveling motor using a smallest value among a plurality of calculated swivel output limiting values derived from the respective temperatures detected by the temperature detection unit.

2. The shovel according to claim 1, wherein each of the respective temperatures detected by the temperature detection unit is in a first range in which a swivel output is not limited or a second range in which the swivel output is limited as the temperature increases, the first range being in a lower temperature region than the second range.

3. The shovel according to claim 2, wherein the control device controls an output of the swiveling motor using a smallest value among a plurality of swivel output limiting values derived from the temperatures in the second range.

4. The shovel according to claim 2, wherein a temperature of the power storage system detected by the temperature detection unit is in the first range, the second range, or a third range which is in a lower temperature region than the first range, and when the temperature of the power storage system is in the third range, the swivel output is limited.

5. The shovel according to claim 2, further comprising:
   a cooling system that circulates a coolant to cool a plurality of cooling targets including the motor generator, the first inverter, the second inverter, the power storage system, and the swiveling motor,
   wherein the cooling system circulates the coolant in a single cooling circuit to cool the plurality of cooling targets.

6. The shovel according to claim 1, wherein the plurality of calculated swivel output limiting values comprises a first swivel output limiting value determined from a temperature of the motor generator, a second swivel limiting value determined from a temperature of the first inverter, a third swivel output limiting value determined from a temperature of the swiveling motor, a fourth swivel output limiting value determined from a temperature of the second inverter, a fifth swivel output limiting value determined from a temperature of a converter of the power storage system and a sixth swivel output limiting value determined from a temperature of a capacitor of the power storage system, wherein the control device controls the output of the swiveling motor using the smallest value among the first swivel output limiting value, the second swivel output limiting value, the third swivel output limiting value, the fourth swivel output limiting value, the fifth swivel output limiting value and the sixth swivel output limiting value.

7. A shovel comprising:
   a traveling body;
   a rotation mechanism;
   a swivel body that is rotatably mounted on the traveling body;
   an attachment that is configured by a boom, an arm, and an end attachment;
   a temperature detection unit that detects respective temperatures of a plurality of components relating to swiveling;
   a control device that limits movement of the rotation mechanism according to a smallest value among a plurality of swivel output limiting values derived from the respective temperatures detected by the temperature detection unit; and
   a display device provided in a cabin mounted on the swivel body,
   wherein the display device includes a first display portion on which information related to the respective temperatures detected by the temperature detection unit is displayed and a second display portion on which information related to limitation on the movement of the rotation mechanism is displayed, and when one of the respective temperatures detected by the temperature detection unit reaches a predetermined threshold value, the limitation on the movement of the rotation mechanism starts and information indicating that the rotation mechanism is driven by reducing maximum output is displayed on the second display portion.

8. The shovel according to claim 7, wherein a bar graph in which the number of lighting increases or decreases based on the temperature detected by the temperature detection unit is displayed on the first display portion.

9. The shovel according to claim 7, wherein when the limitation on the movement of the rotation mechanism has started, the information related to the limitation on the movement of the rotation mechanism displayed on the second display portion is a message indicating that the temperature detected by the temperature detection unit is in a high temperature region, and the movement of the rotation mechanism is being limited.

10. The shovel according to claim 7, wherein when the limitation on the movement of the rotation mechanism has started, the information related to the limitation on the movement of the rotation mechanism displayed on the second display portion is a message indicating that the temperature detected by the temperature detection unit is in a low temperature region, and warming up is being performed to increase the temperature detected by the temperature detection unit.

11. The shovel according to claim 7, wherein the information related to the temperature detected by the temperature detection unit displayed on the first display portion and the information related to the limitation on the movement of the rotation mechanism displayed on the second display portion are displayed on the display device simultaneously.

12. The shovel according to claim 7, wherein a state in which the temperature detected by the temperature detection unit is a suitable temperature, a high temperature state in which the temperature detected by the temperature detection unit is higher than the suitable temperature, and a low temperature state in which the temperature detected by the temperature detection unit is lower than the suitable temperature are distinguishably displayed on the first display portion, and where the control device is configured to limit the movement of the rotation mechanism when the temperature detected by the temperature detection unit is in the high temperature state or the low temperature state.

13. The shovel according to claim 7, further comprising:
a swiveling motor that drives the swivel body,
wherein the swivel body is driven by only the swiveling motor.

14. A shovel comprising:
a traveling body;
a swivel body that is rotatably mounted on the traveling body;
a hydraulic pump that is mounted on the swivel body and discharges hydraulic oil;
electrical devices that are mounted on the swivel body;
a power storage system that is mounted on the swivel body;
a coolant pump that circulates a coolant to cool the power storage system and the electrical devices;
a temperature detection unit that acquires respective temperatures of the power storage system and the electrical devices; and
a control device,
wherein when at least one of a temperature of the power storage system and a temperature of the electrical devices has reached a first threshold value at which cooling starts, the control device is set to a first control state in which the coolant pump is driven to circulate the coolant, and when a temperature of the power storage system has reached a second threshold value at which heating starts, which is lower than the first threshold value, the control device is set to a second control state in which the coolant pump is stopped and the coolant is not circulated,
wherein the control device alternately repeats an operation of the coolant pump over a predetermined operation continuation time and a stop of the coolant pump over a predetermined stop continuation time in order to control a gap between the temperature of the electrical devices and an ambient temperature, and
wherein the control device limits rotation of the swivel body according to a smallest value among a plurality of swivel output limiting values derived from the respective temperatures detected by the temperature detection unit.

15. The shovel according to claim 14, wherein cooling targets of the coolant pump include a plurality of the electrical devices, and an inverter and a converter that drive the electrical devices, and in a case where at least one temperature of the electrical devices, the inverter, and the converter has reached the first threshold value at which cooling starts, the first control state in which the coolant is circulated overrides the second control state even when the temperature of the power storage system has reached the second threshold value at which heating starts.

16. The shovel according to claim 14, wherein cooling targets of the coolant pump include a plurality of the electrical devices, and the control device starts the first control state in which the coolant is circulated when an engine starts regardless of respective temperatures of a plurality of cooling targets detected by the temperature detection unit.

17. The shovel according to claim 14, wherein after the control device has been set to the second control state in which the coolant is not circulated, the control device shifts to the first control state in which the coolant is circulated, on condition that a predetermined time has elapsed.

18. The shovel according to claim 14, wherein the coolant pump is included in a single cooling circuit which does not include a switching valve, and when a temperature of the power storage system has reached the second threshold value at which heating starts, the control device is set to the second control state in which the coolant is not circulated, and to a state in which charging and discharging of the power storage system are repeated so as to heat the power storage system.

19. The shovel according to claim 14, further comprising:
a swiveling motor that drives the swivel body,
wherein the swivel body is driven by only the swiveling motor.

* * * * *